US012623898B1

(12) United States Patent
Donovan et al.

(10) Patent No.: US 12,623,898 B1
(45) Date of Patent: May 12, 2026

(54) INTRODUCTION OF AN ADDITIVE TO WATER

(71) Applicant: BRITA LP, Oakland, CA (US)

(72) Inventors: Madeline A. Donovan, Pleasanton, CA (US); Russell E. Bell, Pleasanton, CA (US); Federico Macoretta, Pleasanton, CA (US); Gavin Shen, Causeway Bay (HK); Piercy Yau, Causeway Bay (HK); Simeon Jupp, Causeway Bay (HK)

(73) Assignee: Brita LP, Brampton (CA)

( * ) Notice: Subject to any disclaimer, the term of this patent is extended or adjusted under 35 U.S.C. 154(b) by 381 days.

(21) Appl. No.: 18/303,182

(22) Filed: Apr. 19, 2023

Related U.S. Application Data

(60) Provisional application No. 63/333,250, filed on Apr. 21, 2022.

(51) Int. Cl.
| | |
|---|---|
| *B67D 3/00* | (2006.01) |
| *C02F 1/00* | (2023.01) |
| *C02F 1/68* | (2023.01) |

(52) U.S. Cl.
CPC ......... *B67D 3/0003* (2013.01); *B67D 3/0041* (2013.01); *B67D 3/0051* (2013.01); *C02F 1/003* (2013.01); *C02F 1/008* (2013.01); *C02F 1/685* (2013.01); *B67D 2210/0001* (2013.01); *C02F 2307/04* (2013.01)

(58) Field of Classification Search
None
See application file for complete search history.

(56) References Cited

U.S. PATENT DOCUMENTS

| | | | |
|---|---|---|---|
| D576,250 | S | 9/2008 | Born et al. |
| D591,389 | S | 4/2009 | Born et al. |
| 7,650,830 | B1 | 1/2010 | Lessis |
| 8,133,525 | B2 | 3/2012 | Skalski et al. |
| 8,227,000 | B2 | 7/2012 | Skalski et al. |
| 8,252,172 | B2 | 8/2012 | Hall |
| 8,308,942 | B2 | 11/2012 | Swain |
| 9,783,405 | B2 | 10/2017 | Olson et al. |
| 10,336,627 | B2 | 7/2019 | Poindexter |
| 10,822,249 | B2 | 11/2020 | McDonald et al. |

(Continued)

FOREIGN PATENT DOCUMENTS

| | | |
|---|---|---|
| EP | 1748957 A0 | 2/2007 |
| EP | 1893524 A0 | 3/2008 |

(Continued)

*Primary Examiner* — Peter Keyworth
(74) *Attorney, Agent, or Firm* — Edell, Shapiro & Finnan, LLC

(57) ABSTRACT

A removable additive assembly includes a vessel and a pump module or nozzle housing. The vessel defines an interior volume configured to hold an additive, such as a flavoring and/or nutritional (e.g., vitamin) additive. The pump includes an actuator that is configured to attach to a reciprocating coupler that can drive the pump to create cyclical intake and discharge strokes to pump the additive through the nozzle. The removable additive assembly may be a portion or component of an additive assembly that includes actuating components and one or more reciprocating couplers configured to drive one or more pumps of one or more removable additive assemblies.

18 Claims, 26 Drawing Sheets

(56)     References Cited

U.S. PATENT DOCUMENTS

| | | | |
|---|---|---|---|
| 2008/0190827 A1 | 8/2008 | Rinker et al. | |
| 2010/0133297 A1* | 6/2010 | Arett ...................... | A47G 19/12 |
| | | | 222/129 |
| 2012/0148707 A1 | 6/2012 | Lackey et al. | |
| 2012/0298594 A1 | 11/2012 | Skalski et al. | |
| 2014/0312060 A1* | 10/2014 | Heatherly ............... | F16K 7/065 |
| | | | 222/23 |
| 2021/0007533 A1 | 1/2021 | Lyons et al. | |
| 2021/0316978 A1 | 10/2021 | Lyons et al. | |
| 2021/0400913 A1* | 12/2021 | Feez ........................ | A01K 7/02 |

FOREIGN PATENT DOCUMENTS

| | | | |
|---|---|---|---|
| EP | 1893536 | A0 | 3/2008 |
| EP | 1996519 | A0 | 12/2008 |
| EP | 2447642 | A2 | 5/2012 |
| EP | 2475584 | A0 | 7/2012 |
| EP | 3220783 | A0 | 9/2017 |

* cited by examiner

570

702

700

320

600

520

700

570

1320

1310

1311

1320

1322

1326

1314

1312

1310

1324

1326

1310

3126

3116

3106

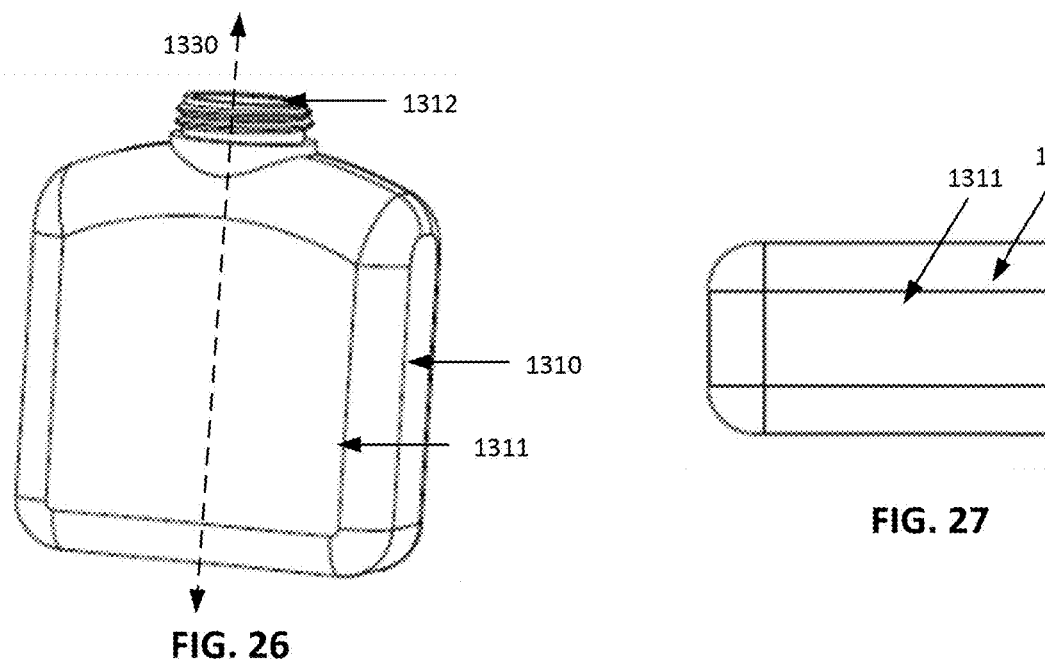
FIG. 26
FIG. 27
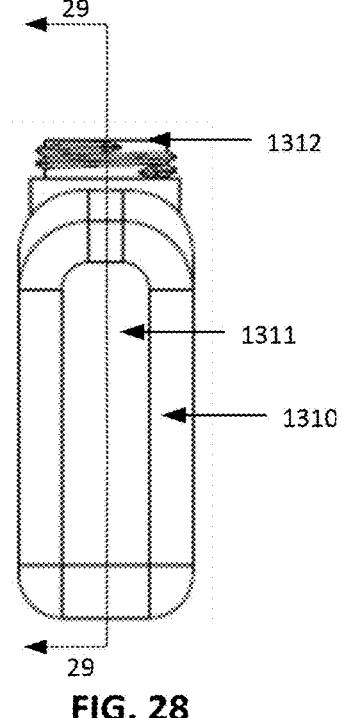
FIG. 28
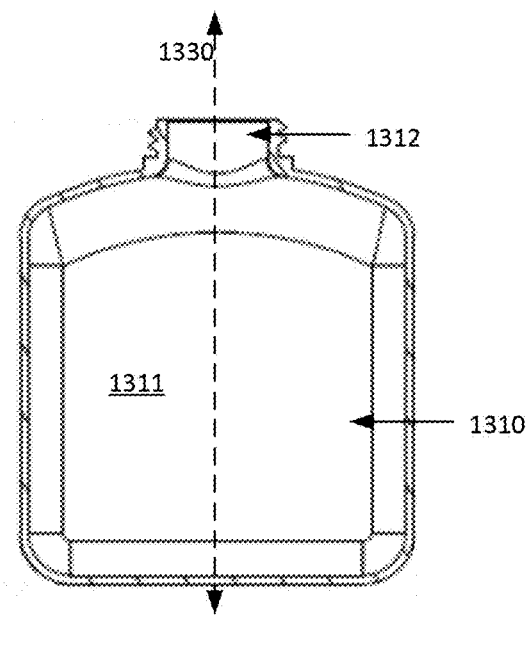
FIG. 29

INTRODUCTION OF AN ADDITIVE TO WATER

RELATED APPLICATION

This application claims priority to U.S. Patent Application Ser. No. 63/333,250, filed Apr. 21, 2022, entitled "Introduction of an Additive to Water," the disclosure of which is incorporated by reference herein in its entirety.

TECHNICAL FIELD

The present application relates to devices and techniques that can introduce an additive to water as the water is dispensed (e.g., poured). More specifically, the present application relates to devices and techniques that can introduce an additive to water as the water is dispensed (e.g., poured) from water filtration devices, such as those used in residential and/or commercial applications.

BACKGROUND

Water filtration apparatuses often include a removable and replaceable filter assembly. For example, some water filtration pitchers or countertop containers are configured to position a filter assembly between a first reservoir and a second reservoir. Water is filtered as it passes from the first reservoir to the second reservoir through the filter assembly. Alternatively, a pitcher or countertop container may filter water as water is poured or dispensed therefrom. As another example, water filtration apparatuses may be configured to attach to a faucet or another such water source and may position a filter assembly to filter water as the water is dispensed from the faucet or water source. In any of these instances, a user may want to add an additive, such as a flavoring or nutritional additive (e.g., vitamins), to the filtered water. Thus, solutions that can introduce an additive to filtered water have been introduced. However, these solutions often create contamination issues when introducing an additive and/or do not adequately mix an additive into filtered water.

SUMMARY

Techniques and devices for introducing an additive to filtered water as the filtered water is dispensed (e.g., poured) are disclosed. These techniques and devices may be embodied as one or more apparatuses, one or more methods, and/or one or more systems. For example, in accordance with at least one embodiment, the present application is directed to a removable additive assembly that includes a vessel, such as a tank or bottle or pouch, and a pump module. The vessel defines an interior volume configured to hold an additive, such as a flavoring and/or nutritional (e.g., vitamin) additive. The pump module includes a pump and a nozzle. In one embodiment, the pump module utilizes a gear arrangement that drives the pump to supply additive through the nozzle. In another embodiment, the pump includes an actuator that is configured to attach to a reciprocating coupler that can drive the pump to create cyclical intake and discharge strokes to pump the additive through the nozzle.

In at least some embodiments, the removable additive assembly is provided as a single unit that is entirely replaced, e.g., when the additive is depleted. In fact, in some instances, the removable additive assembly may provide an additive delivery path that completely separates the additive from filtered water to which it will be added unless and until the removable additive assembly is actuated. This prevents the additive from contaminating filtered water, e.g., when filtered water is stored in a filtered water reservoir.

In some instances, an additive is introduced to a stream of filtered water as the filter water is being poured from a spout of a water filtration apparatus. In other instances, an additive is introduced to a stream of water exteriorly of a spout of a water filtration apparatus in which the removably additive assembly is installed. That is, in some instances, the additive delivery path is separate from the filtered water until the filtered water is poured out of the pitcher and, thus, the additive delivery path may be described as being "outside of the pitcher," which helps avoid creating contamination. This will further protect the water filtration apparatus (e.g., the pitcher), water stored therein, and the removably additive assembly from bacteria/contaminant buildup while also encouraging optimal mixing.

Additionally or alternatively, the removable additive assembly may be a subassembly of an additive assembly that includes an additive assembly housing. The additive assembly housing can include a top configured to removably secure one or more removable additive subassemblies and an interior cavity configured to receive actuating components. The top may also include one or more reciprocating members configured to drive each of the one more removable additive subassemblies secured to the additive assembly housing (e.g., when the one or more reciprocating members are driven by the actuating components).

The additive assembly housing may seal the interior cavity and, thus, may protect any actuating components over a long life span while the removable additive subassemblies may be replaced after a predetermined number of "doses." This may ensure that any components exposed to additive and/or water are periodically changed, drastically reducing the chances of bacteria/contaminant buildup. This also ensures that the relatively more expensive actuating components of the removable additive subassembly are protected from contaminants and need not be continually replaced. Still further, since the relatively more expensive actuating components of the removable additive subassembly are not included in the removable additive assemblies, the removable additive subassembly cost is reduced while the sustainability is improved.

In at least some embodiments, the additive assembly housing is disposed in or adjacent to a filter reservoir of a portable water filtration apparatus. Additionally or alternatively, the additive assembly housing may position one or more nozzles of the one or more removable additive assemblies in a flow path of water being poured. Then, the nozzles will be rinsed while introducing an additive into poured water that mixes seamlessly into the poured water. In fact, in some embodiments, the one or more nozzles may be positioned exteriorly of a spout to eliminate backflow from the one or more nozzles into a clean water reservoir of the portable water filtration apparatus. The additive assembly may also include sensors that activate actuating components of the additive assembly housing (to drive pumping action) during pouring and/or at a predetermined time during a pouring. This may prevent the additive assembly housing from wasting an additive and/or encourage "dosing" of an additive during a portion of a pour that encourages optimal/enhanced mixing of the additive into water. These and other advantages and features will become evident in view of the drawings and detailed description.

In one embodiment of the present invention, a water dispensing apparatus comprises a housing defining a first receiving area, a second receiving area, an inlet in fluid communication with the first receiving area, and an outlet in fluid communication with the second receiving area, a filter in fluid communication with the first receiving area and the second receiving area, water in the first receiving area flows through the filter to the second receiving area, an additive delivery system disposable proximate to the housing, the additive delivery system including a source of an additive, a nozzle coupled to the source, a pump that operates to cause the additive to flow from the source to the nozzle, and a sensor that detects when water is present at the outlet, the sensor causing the pump to operate when water is detected, thereby causing the additive to be added to the water at the outlet.

In one embodiment, the additive delivery system includes a user selectable portion that contains at least one button, the at least one button being activatable by a user to select the option of the additive delivery system supplying an additive to the water at the outlet. In another embodiment, the at least one button can be pressed by a user multiple times to select a concentration level of the additive to be added. Alternatively, the additive delivery system includes a controller, a motor, and a gear arrangement, the controller receiving a first signal from the sensor when the sensor detects water, the controller sending a second signal to the motor in response to the first signal, the motor driving the gear arrangement to operate in response to the second signal. Additionally, the gear arrangement is engaged with the pump, the gear arrangement includes a driver gear that moves the pump, a planetary gear selectively engageable with the driver gear, and a planetary gear carrier to which the planetary gear is mounted, the planetary gear carrier being movable so that the planetary gear moves between a first position in which it is engaged with the driver gear and a second position in which it is spaced apart from the driver gear.

In another embodiment, the gear arrangement is engaged with the pump, and operation of the gear arrangement causes the pump to provide an additive from the source to the nozzle. In one embodiment, the housing includes a third receiving area proximate to the outlet, the nozzle being located in the third receiving area, and the sensor being located in the third receiving area. In another embodiment, the additive delivery system being operable only when the sensor detects the presence of water in the third receiving area and when a user has selected that the additive delivery system is to be operable. Alternatively, the additive delivery system includes a selector button associated with the source, and a user can actuate the selector button to provide input regarding the source.

In one embodiment, a lid is removably coupled to the housing, the lid having a body defining a first upper portion and a second upper portion, the first upper portion including a receptacle in which the source may be placed and a first repositionable cover that covers the receptacle, the second upper portion including an opening therethrough and a second repositionable cover the covers the opening, wherein the second repositionable cover can be opened to allow access to the first receiving area, and the first repositionable cover can be opened to allow access to the receptacle for the source. In another embodiment, the lid includes an electronic section located between the first upper portion and the second upper portion, the electronic section including at least one button selectable by a user to indicate that additive from the source is desired.

In an alternative embodiment of the present invention, a water dispensing apparatus comprises a housing defining a first internal area, a second internal area, an inlet, and an outlet, a filter located between and in communication with the first internal area and the second internal area, a lid removably coupleable to the housing, the lid including a fill opening through which water can pass into the first internal area, the lid also including an additive delivery system coupled thereto, the additive delivery system including a vessel containing an additive, a pump and nozzle assembly coupled to the vessel, the pump and nozzle assembly drawing the additive out of the vessel, a gear arrangement mounted to the lid, the gear arrangement operably coupleable to the pump and nozzle assembly, and a sensor that detects the presence of water at the outlet, the sensor causing the pump and nozzle assembly to operate when water is detected, thereby causing the additive to be added to the water at the outlet.

In one embodiment, the lid includes a receptacle in which the vessel and the pump and nozzle assembly are located, and the pump and nozzle assembly includes an eccentrically mounted pin that is moved by the gear arrangement. In another embodiment, the additive delivery system includes a button that is activatable by a user to select the additive to be added to the water, and the pump and nozzle assembly operate only after the button has been activated by the user and the sensor detects water. In yet another embodiment, the gear arrangement is engaged with the pump and nozzle assembly, the gear arrangement includes a driver gear that moves the pump of the pump and nozzle assembly, a planetary gear selectively engageable with the driver gear, and a planetary gear carrier to which the planetary gear is mounted, the planetary gear carrier being movable so that the planetary gear moves between a first position in which it is engaged with the driver gear and a second position in which it is spaced apart from the driver gear.

In one embodiment, the housing includes a third receiving area proximate to the outlet, the nozzle being located in the third receiving area, the sensor being located in the third receiving area, the additive delivery system being operable only when the sensor detects the presence of water in the third receiving area and when a user has selected that the additive delivery system is to be operable. In another embodiment, the vessel is a first vessel, the additive is the first additive, the pump and nozzle assembly is a first pump and nozzle assembly, and the additive delivery system further comprises a second vessel containing a second additive, a second pump and nozzle assembly coupled to the second vessel, the second pump and nozzle assembly drawing the second additive out of the second vessel, wherein the gear arrangement is operably coupleable to the second pump and nozzle assembly, and the gear arrangement only allows one of the first pump and nozzle assembly or the second pump and nozzle assembly to operate at once.

In another embodiment of the present invention, a method of using a water dispensing apparatus to supply an additive to water, the water dispensing apparatus including a housing, a filter, and an additive delivery system, the additive delivery system including a vessel containing an additive, a pump operatively coupled to the vessel, a user selectable button, and a gear arrangement that drives the pump, the method comprising actuating the user selectable button associated with the vessel, manipulating the housing to cause water that has been filtered by the filter to move proximate to an outlet of the housing, sensing the presence of water proximate to the outlet of the housing, determining whether the user selectable button has been actuated, and activating the gear arrangement to drive the pump to dispense an amount of the additive from the vessel when water is sensed proximate to the outlet and the user selectable button has been actuated.

In one embodiment, the additive delivery system includes a sensor disposed proximate to the outlet of the housing, and the sensor performs the step of sensing the presence of water. In another embodiment, the step of actuating the user selectable button includes one of pressing the button once for a first level of additive to be dispensed, pressing the button twice for a second level of additive to be dispensed, or pressing the button three times for a third level of additive to be dispensed, and each of the first level, the second level, and third level being different than the other levels.

BRIEF DESCRIPTION OF THE DRAWINGS

To complete the description and in order to provide for a better understanding, a set of drawings is provided. The drawings form an integral part of the description and illustrate embodiments of the present application, which should not be interpreted as restricting the scope of the application. The drawings comprise the following figures:

FIG. 26 is a perspective view of an embodiment of a vessel that can be used with the water dispensing apparatus illustrated in FIG. 3, according to an example embodiment.

FIG. 27 is a bottom view of the vessel illustrated in FIG. 26.

FIG. 28 is a side view of the vessel illustrated in FIG. 26.

FIG. 29 is a cross-sectional front view of the vessel illustrated in FIG. 26 taken along the line "29-29" in FIG. 28.

Like reference numerals have been used to identify like elements throughout this disclosure.

DETAILED DESCRIPTION

The following description is not to be taken in a limiting sense, but is given solely for the purpose of describing the broad principles of the present application. Embodiments of the present application will be described by way of example, with reference to the above-mentioned drawings showing elements and results of such embodiments.

Generally, the techniques presented herein introduce an additive, such as a flavor additive, into water as the water is dispensed (e.g., poured) from a container. In some embodiments, the additive is dispensed by a removable and replaceable additive assembly. The replaceable additive assembly can store a predetermined amount of the additive (e.g., X number of "doses" or "micro-doses") and can also include a pump (e.g., a "micro-dosing pump") that can selectively dispense the additive (i.e., "dose" the additive"). Thus, in those embodiments, a user will have a clean pump every time the replaceable additive assembly is replaced. The removable additive assembly may also be sized and/or configured to dose the additive into a stream of water so that the additive mixes into water as water is dispensed (e.g., poured). In fact, a nozzle of the removable additive assembly may be specifically sized and/or configured to prevent backflow of the additive into a reservoir of water (e.g., a reservoir of filtered water). This may prevent, or at least discourage, bacterial growth and/or contaminant introduction into a reservoir of water.

In at least some instances, the pump of the replaceable additive assembly includes a pumping chamber and actuator. However, a housing into which the replaceable additive assembly is to be installed includes all actuating components for this pump (e.g., a power source and mechanical linkage components). Put another way, in at least some instances, the pump may be split into components that contact the additive and components that do not contact the additive. The components that do not contact the additive include actuating components (e.g., a drive train) and are not intended to be replaceable. This may minimize the cost of the replaceable additive assembly. This may also extend the life of actuating components since these components can be secured in a substantially sealed housing.

Figure 1:
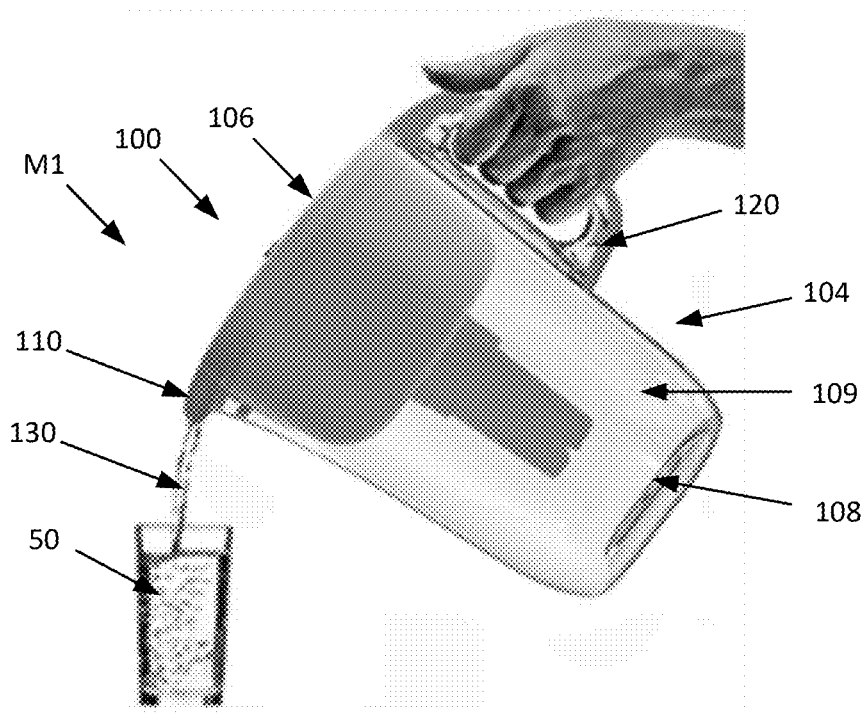
FIG. 1 is a side view of a water dispensing apparatus being used to pour liquid in a first mode of operation according to an example embodiment.
Figure 2:
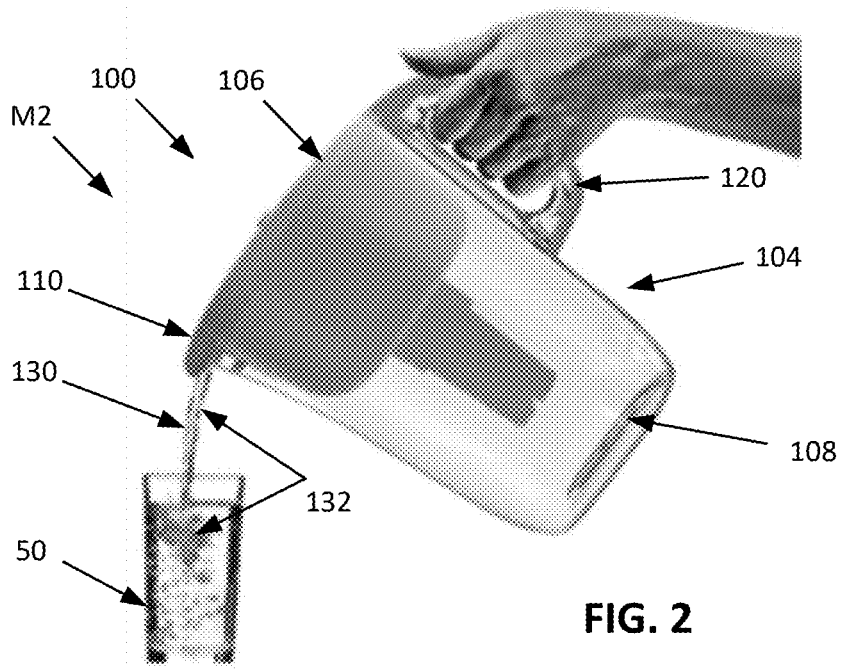
FIG. 2 is a side view of the water dispensing apparatus illustrated FIG. 1 being used to pour liquid in a second mode of operation.

Now turning to FIGS. 1 and 2, these figures illustrate additive introduction techniques at a high-level. In these Figures, as well as many of the other Figures of the present application, a water dispensing apparatus 100 is illustrated as a pitcher. This pitcher is described in detail herein; however, this pitcher is merely representative of a water dispensing apparatus 100 that may be used to execute the techniques presented herein. In other embodiments, the water dispensing apparatus 100 may comprise a countertop container, a faucet-attached apparatus, or any other water dispensing apparatus. In any case, the water dispensing apparatus 100 may generally include a housing 104 that extends from an upper end 106 to a lower end 108 to define at least some interior volume 109 for water. Moreover, in some instances, the housing 104 may include a handle 120.

Regardless of the shape of the housing 104, the housing 104 includes an outlet region 110 from which water (e.g., filtered water) can be dispensed. With the techniques presented herein, the water dispensing apparatus 100 can dispense water through the outlet region 110 in at least two modes. For example, as shown in FIG. 1, in a first mode M1, the water dispensing apparatus 100 may dispense water without any introduction of an additive into the water stream 130 dispensed from the outlet region 110. Then, in a second mode M2, the water dispensing apparatus 100 may dispense water while introducing an additive 132 into the water stream 130 dispensed from the outlet region 110. However, the two modes shown in FIG. 1 and FIG. 2 are merely intended to illustrate the techniques presented herein at a high-level and should not be construed as limiting the techniques herein to two modes or as limiting the techniques in any other manner.

When the water stream 130 and additive 132 are dispensed into another container, such as cup 50, the additive 132 will naturally mix with the water due to turbulence created by the water stream 130. In fact, as is described in further detail below, the techniques presented herein may be specifically designed to enhance and/or optimize the mixing of the additive 132 into water when a water dispensing apparatus 100 implementing the techniques presented herein dispenses a water stream 130 with an additive 132.

Figure 3:
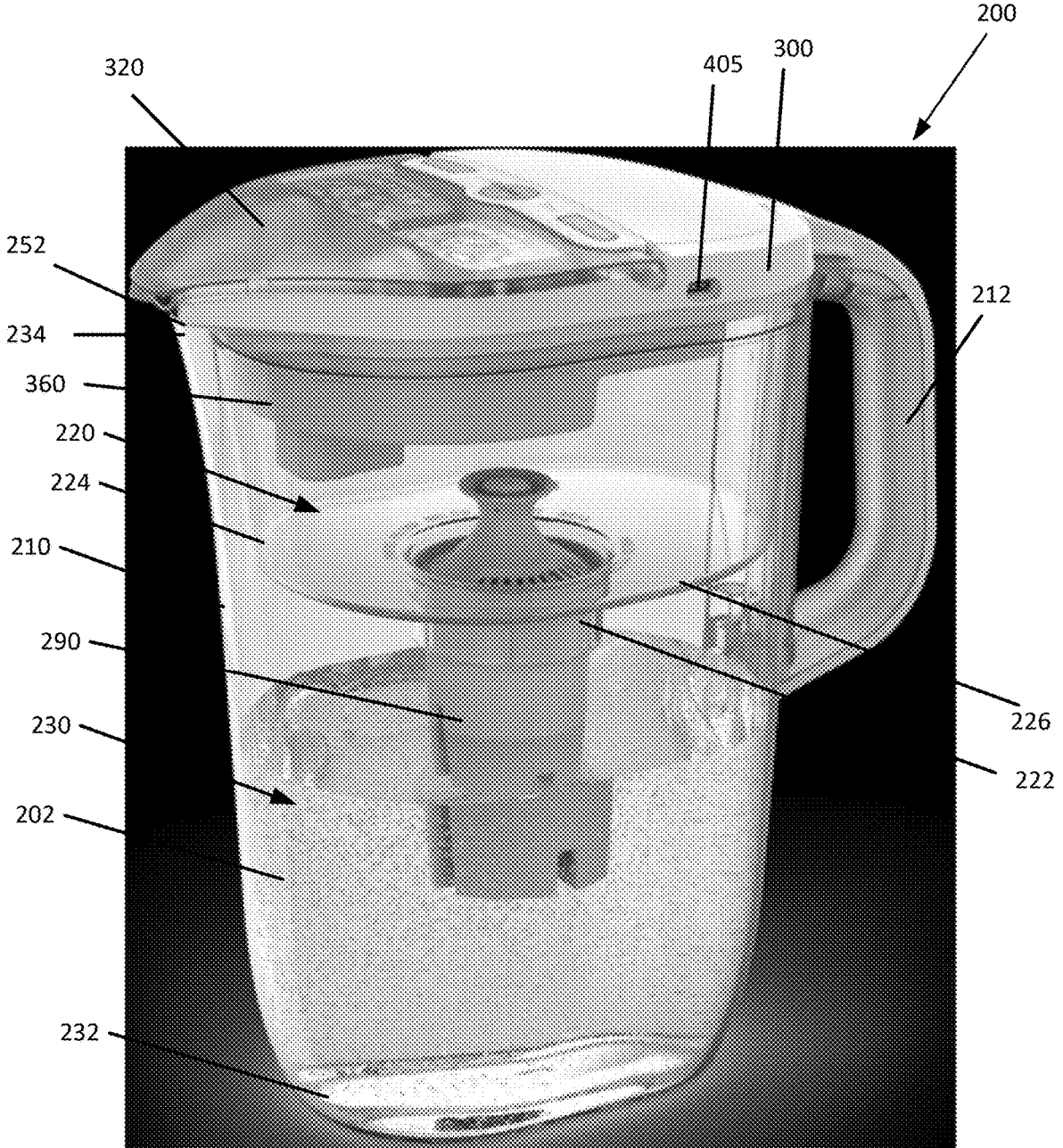
FIG. 3 is a perspective view of an embodiment of a water dispensing apparatus according to the present disclosure.
Figure 4:
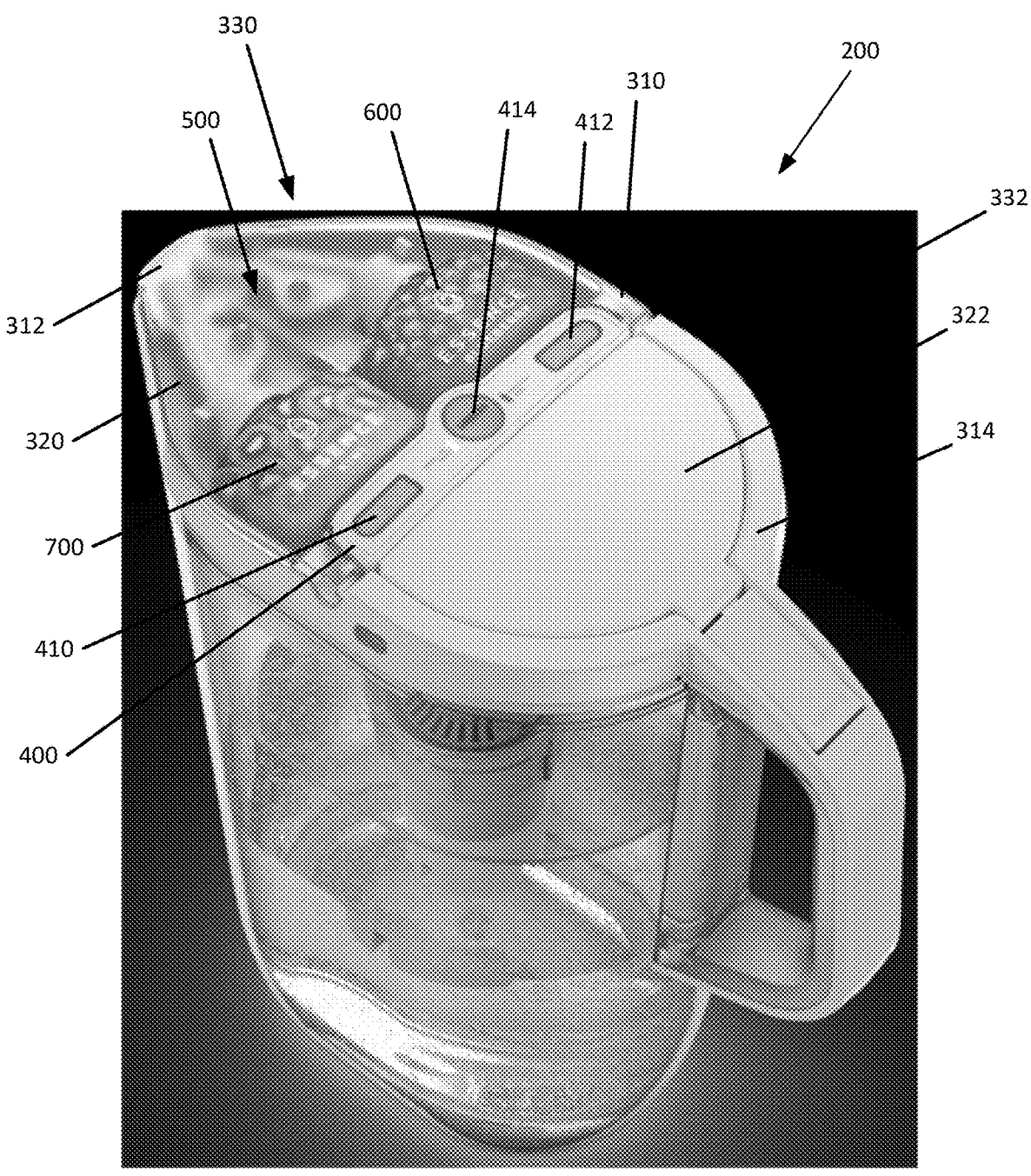
FIG. 4 is another perspective view of the water dispensing apparatus illustrated in FIG. 3.

Now turning to FIGS. 3 and 4, an embodiment of a water dispensing apparatus according to the present invention is illustrated. In this embodiment, the water dispensing apparatus 200 includes a housing 210, which defines the silhouette of the water dispensing apparatus 200, and a handle 212 coupled to the housing 210. The water dispensing apparatus 200 also includes a cover or lid 300 that is disposed above and on top of the housing 210. The cover 300 substantially closes a first reservoir 220 (i.e., an unfiltered reservoir), which can be referred to alternatively as a first receiving area or first internal area. The first reservoir 220 is disposed above a second reservoir 230 (i.e., a clean water reservoir containing filtered water 202), which can be referred to alternatively as a second receiving area or second internal area. The first reservoir 220 includes a filter housing receptacle 222 configured to receive a filter 290 through which water passes to move from the first reservoir 220 to the second reservoir 230.

In the depicted embodiment, the cover 300 has a body 310 that extends from a first end 312 to a second end 314. The first end 312 defines at least a portion of an outlet region 252 of the housing 210 while the second end 314 sits atop the handle 212 (and in some embodiments, is mechanically coupled to the handle 212). Between the first end 312 and the second end 314, the main body 310 of the cover 300 includes a first upper portion 330, a second upper portion 332, and an electronic portion or section 400 that is located between the first upper portion 330 and the second upper portion 332. Two smaller lids or covers 320 and 322 are located proximate to and cover the first upper portion 330 and the second upper portion 332, respectively. Lid 320 is located above an additive delivery system 500 that is included in the water dispensing apparatus 200, and lid 322 is located above a fill opening 316 (see FIG. 5) into which unfiltered water is poured into the first reservoir 220. In this embodiment, lid 320 provides visual and physical access to portions of the additive delivery system 500, and allows a user to identify the particular flavors of the additives by seeing which additive vessels 600 and 700 are present. In some embodiments, the lids 320 and 322 are movably (e.g., pivotably or slidably) coupled to the cover body 310 to allow a user to move them to access the fill opening 316 or the additive delivery system 500. However, other embodiments may include any combination of features to allow access to the additive delivery system 500, such as two actuator openings and a pivotable window or a pivotable window and no actuator openings.

Referring back to FIG. 3, the first reservoir 220 is generally an open-top reservoir defined by a side wall 224 and a lower wall 226. The first reservoir 220 has a filter housing receptacle 222 extends downwards from the lower wall 226. The filter housing receptacle 222 illustrated in FIG. 3 is merely an example and in other embodiments of the apparatus 200, the filter housing receptacle 222 may have different dimensions and/or different shapes. In one embodiment, the filter housing receptacle 222 may only protrude a small amount below the lower wall 226. In other embodiments, the filter housing receptacle 222 may be an annular support or hole configured to receive a filter (e.g., similar to those commercially available as the BRITA TAHOE product that is configured to receive a BRITA ELITE FILTER).

The second reservoir 230 is also a generally open-top reservoir defined by the housing 210, which forms a side wall of the reservoir 230, and a bottom or bottom wall 232. The cover 300 is generally configured to close the first reservoir 220, but the second reservoir 230 is only partially closed by the first reservoir 220 and/or the cover 300. This is because the second reservoir 230 includes a spout 234 that extends exteriorly along the first reservoir 220 to define the outlet region 252 of the water dispensing apparatus 100 (as is described in further detail below). However, as mentioned, the present application should not be limited to pitcher-style water dispensing apparatuses and thus, in different embodiments, the spout 234 may have a different form factor and, for example, may be or resemble a spigot (an example of which is discussed below).

In the illustrated embodiment, the cover body 310 includes a battery charging port 405 located on one side (see FIG. 3). The battery charging port 405 is used to charge a battery (discussed below) located in the cover 300.

To allow for different operational modes, the electronic section 400 includes multiple selector buttons. The selector buttons are used to select one or both of the available additives for actuation and to select a "dosage level" for the one or more selected additive assemblies. For example, the "dosage level" might be high, medium, or low, with the different options associated with different volumes or weights of additive (e.g., 1 mL, 2 mL, or 3 mL, which may be achieved based on a corresponding amount of pump activation time).

Referring to FIG. 4, in this embodiment, the electronic system 400 includes selector button 410 and selector button 412, each of which is associated with one of the additive vessels. When a user desires a particular additive material, the user can press the appropriate one of either selector button 410 or selector button 412. The dosage level of the additives can be varied by the user by the quantity of times that selector button 410 or selector button 412 is pressed. If a low dosage amount is desired, a single press is all that is needed. If the user presses button 410 or 412 twice, a medium dosage amount will be supplied. Similarly, if the user presses button 410 or 412 three times, a large dosage amount will be supplied. When the water sensors 422 and 424 detect the presence of water, the selected button 410 or 412 is illuminated.

In this embodiment, the water dispensing apparatus 200 includes a filter indicator 414, which is illuminated when water is detected by the water sensors 422 and 424, to convey the status of the filter 290 in the apparatus 200. The electronic system 400 of the apparatus 200 includes an optical sensor that identifies when the lid 322 is opened, thereby representing the filing of the first reservoir 220. The optical sensor and indicator 414 uses power from a battery in the apparatus 200. The filter indicator 414 changes color based on the usage of the filter. Initially, the filter indicator 414 flashes green as the apparatus 200 is used to pour water. After numerous pours as detected by the optical sensor, the filter indicator 414 flashes amber. After another quantity of pours have been detected by the optical sensor, the filter indicator 414 flashes red.

In one embodiment, the water dispensing apparatus 200 may include an indicator associated with the battery and/or the battery charging port. The battery indicator can be used to indicate the status of the rechargeable battery. The battery charging port indicator can be used to indicate whether a charger is present and charging the battery.

Figure 5:
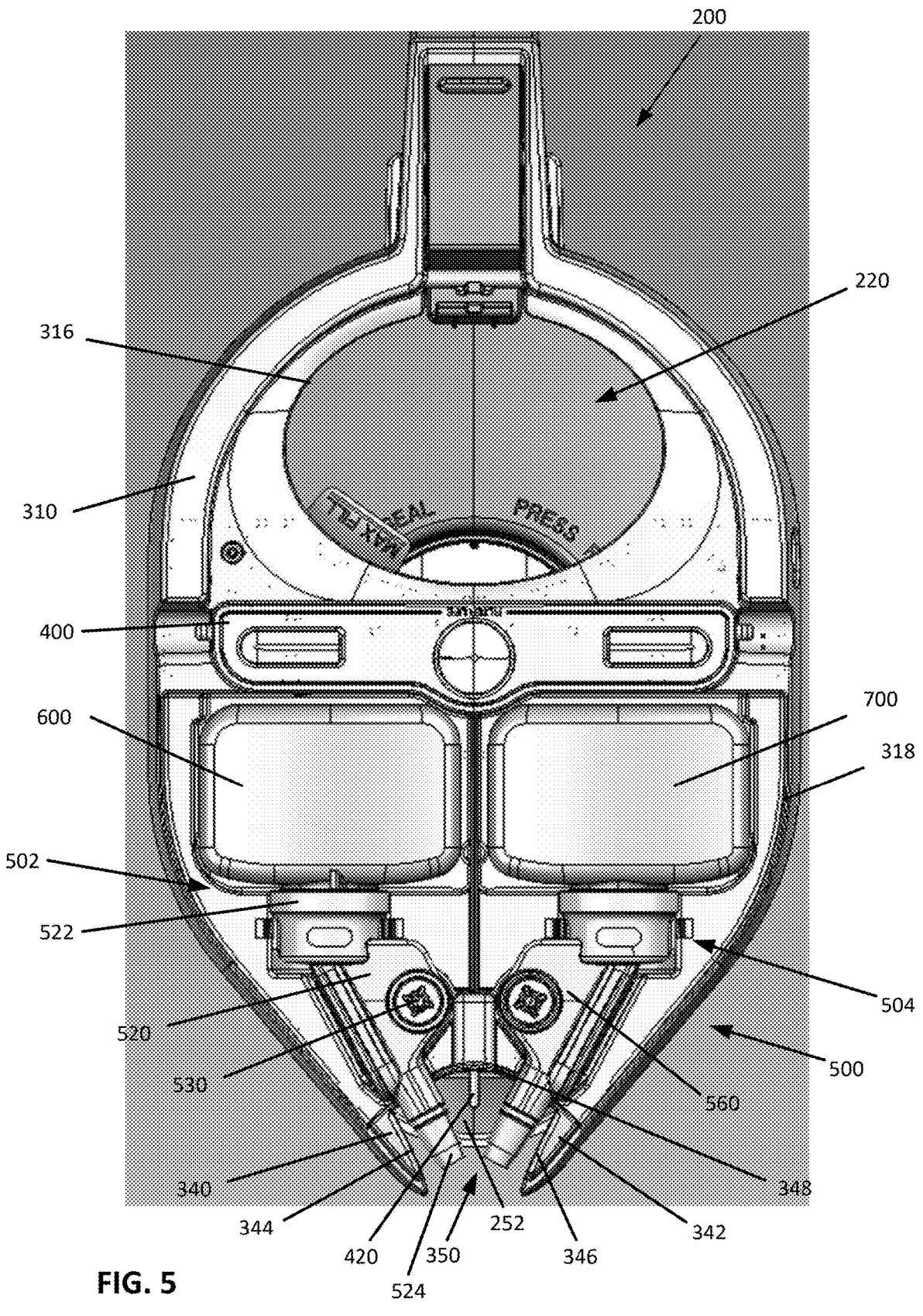
FIG. 5 is a top view of some of the components of the water dispensing apparatus illustrated in FIG. 3.
Figure 6:
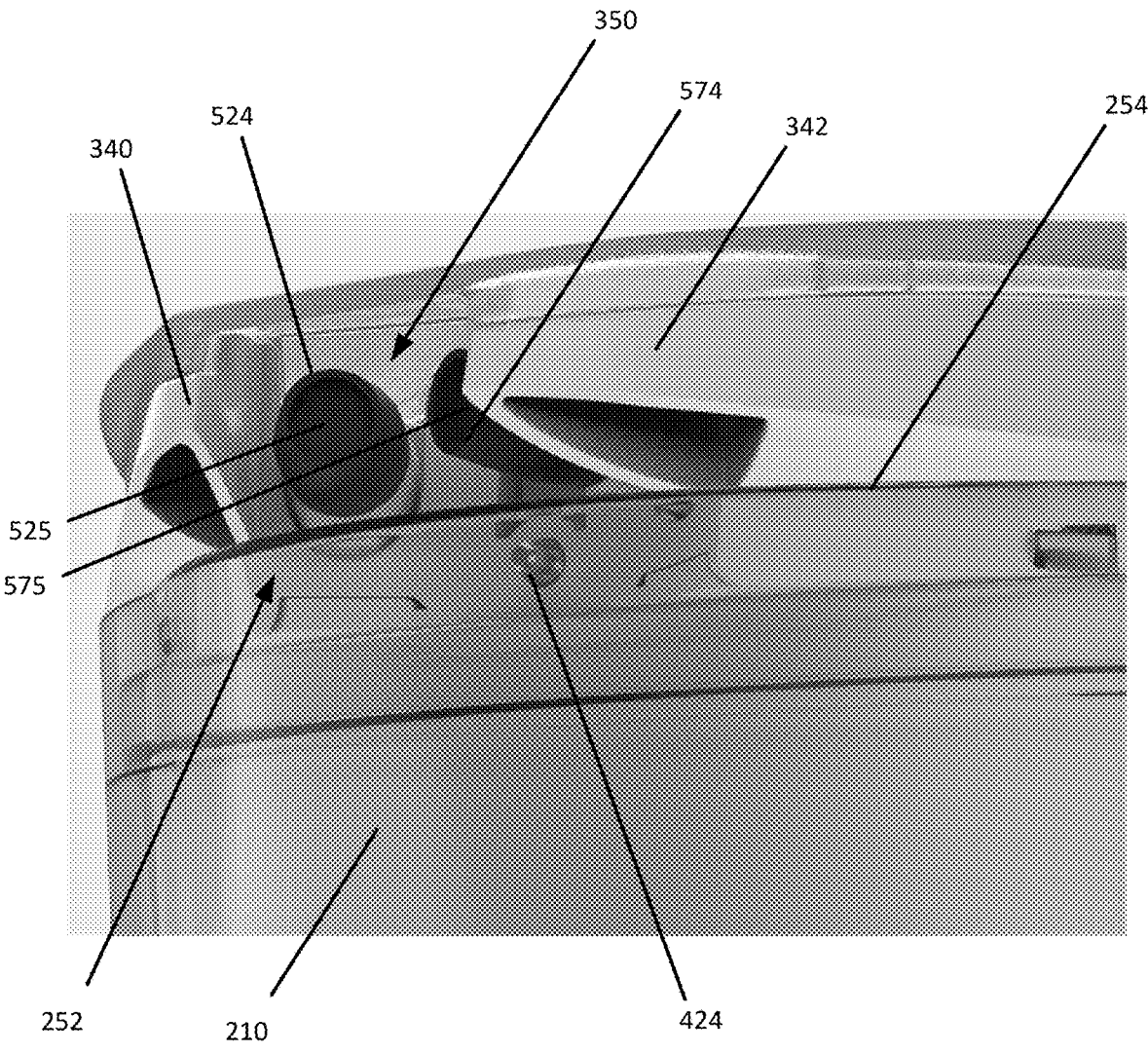
FIG. 6 is a close-up front perspective view of the housing and the lid of the water dispensing apparatus illustrated in FIG. 3.

Referring now to FIGS. 5 and 6, both of the lids 320 and 322 have been removed from the cover body 310. With lid 322 being removed, the fill opening 316 is visible. The fill opening 316 is defined by an edge in the cover body 310. The fill opening 316 is in communication with first reservoir 220. In this embodiment, the additive delivery system 500 is disposed substantially between the first reservoir 220 and an upper surface of the cover or lid 320. Thus, a user may be able to access the additive delivery system 500 by lifting or pivoting the cover 320. At a high-level, the additive delivery system 500 includes one or more removable additive assemblies 502 and 504. In the embodiment illustrated in FIG. 5, the first removable additive assembly 502 and a second removable additive assembly 504 are both installed in/coupled to the cover body 310. However, additive assembly 500 including two removable additive assemblies 502 and 504 is merely one example embodiment, and other embodiments may include any number of removable additive assemblies.

Generally, the first removable additive assembly 502 includes a first vessel or additive source 600 (which, in this embodiment, is in the form of a tank or bottle) and a first pump module 510. Similarly, the second removable additive assembly 504 includes a second vessel 600 and a second pump module 560. Additive assemblies 502 and 504 have their own pump modules, which allows each additive assembly to function independently of the other one. As a result, either removable additive assembly 502 or 504 can introduce an additive to a flow of water once coupled to the cover 300.

Moreover, in the illustrated embodiment, additive assemblies 502 and 504 are nearly identical. Likewise, the receptacles in which the additive assemblies 502 and 504 may be installed (described in further detail below) are nearly identical, except for their orientation/positioning. Thus, solely for brevity, this application sometimes describes only one receptacle, only one additive assembly, or a generic version of such components. However, any such description should be understood to apply to like components unless otherwise explicitly stated. For example, any description of one of the additive assemblies 502 and 504 (or the like) should be understood to apply to the first additive assembly 502 and to the second additive assembly 504. At the same time, the applicability of descriptions to like components should not limit the present application to specific implementations. Instead, an apparatus or system formed in accordance with the present application may include any combination of different or similar components, such as different or similar removable additive assemblies 502 and 504 (which may removably coupled to a cover 300 in any desirable receptacles).

Still referring to FIGS. 4 and 5, but now turning to the cover body 310, the cover body 310 includes a sidewall 318 that is configured to engage and/or sit on/against the side wall 224 of the first reservoir 220. The cover body sidewall 318 extends between a top and a bottom of the body 310. The bottom of the cover body 310 is spaced from the lower wall 226 of the first reservoir 220 so that at least some volume of water can be disposed beneath the cover body 310 when the first reservoir 220 is filled with water (e.g., via fill opening 316).

Referring to FIG. 5, some of the features of the additive assemblies 502 and 504 are discussed. While only the features of additive assembly 502 are discussed, it is to be understood that additive assembly 504 has similar features. Additive assembly 502 includes a vessel 600 containing an additive material, and a nozzle housing 520 that can be removably coupled to the vessel 600. The nozzle housing 520 includes a coupling end 522 at one end that includes a collar portion with internal threads that can be threaded onto the neck of the vessel 600, as described below. The nozzle housing 520 includes a valve tip 524 at the opposite end from the coupling end 522. In this embodiment, the additive assembly 502 includes a pump (not shown) that is driven to operate via rotation of an eccentric shaft 530.

Also illustrated in FIG. 5 are some additional features of the cover 300. Proximate to end 312, the cover body 310 includes arms 340 and 342 that have inner or inwardly facing walls or wall surfaces 344 and 346, respectively. The cover body 310 also includes a wall or wall surface 348. The walls 344, 346, and 348 collectively form a receptacle or receiving area 350 into which water in the housing 210 flows from the outlet 252. In this embodiment, the valve tip of each nozzle housing 520 and 560 is located so that it ends in the receiving area 350 as well. As a result, the additive material from either or both of the vessels 600 and 700 is introduced into the receiving area 350 along with the water from outlet 252.

Figure 7:
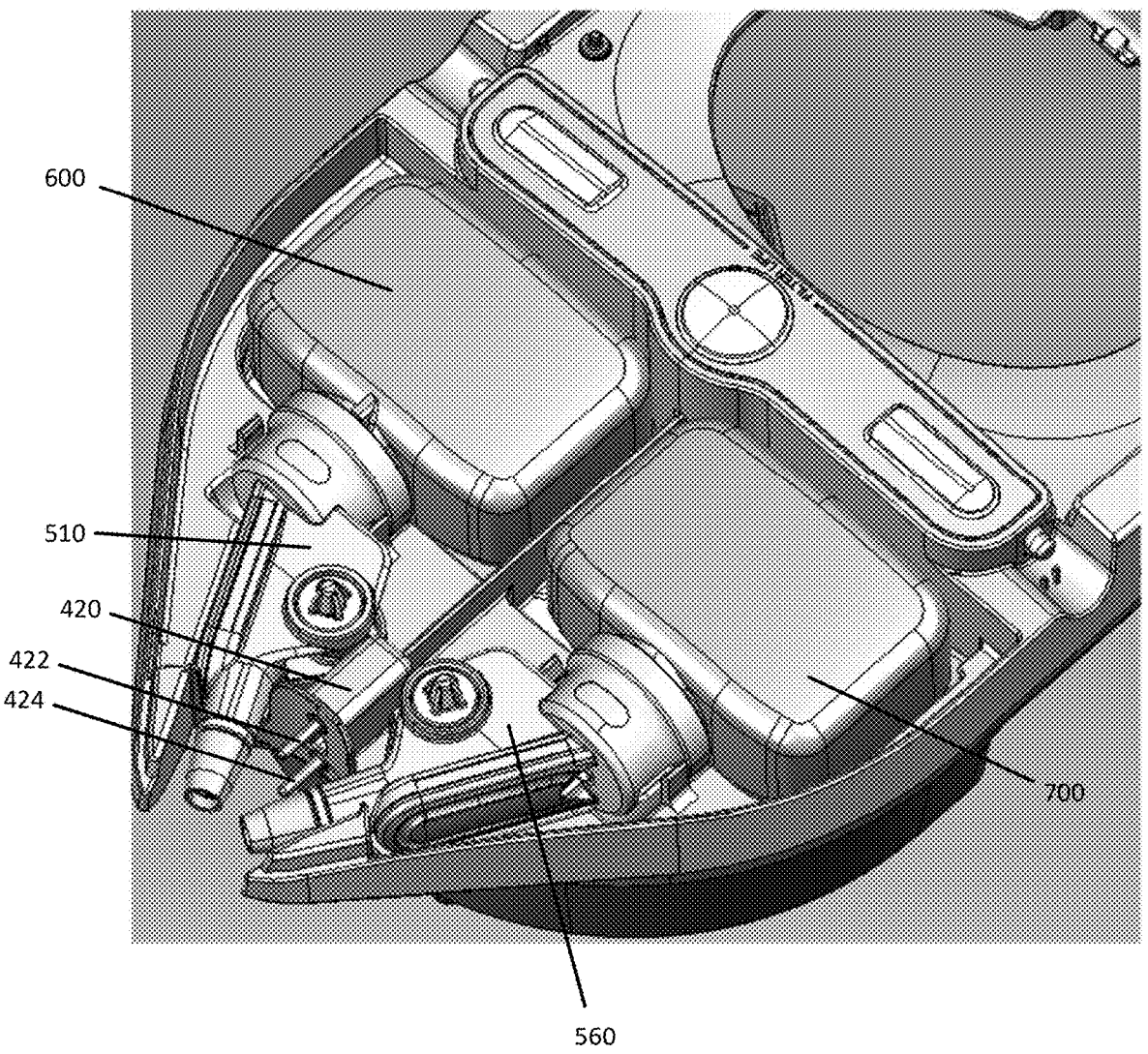
FIGS. 7-9 are close-up top perspective views of various components of the water dispensing apparatus illustrated in FIG. 3.

Turning to FIGS. 6 and 7, the water dispensing apparatus 200 includes a sensor unit 420 with water sensors 422 and 424 that are located in the receiving area 350. In this embodiment, the water sensors 422 and 424 are spaced apart from each other in a vertical orientation. The vertical orientation of sensors 422 and 424 is preferrable to a side-to-side or horizontal orientation because it results in a more desired sensitivity. When water contacts and is connected to both water sensors 422 and 424, the sensor unit 420 sends a signal back to the controller of the water dispensing apparatus 200 to indicate that water is present in the receiving area 350. When that signal is received by the controller, the controller activates the additive delivery system 500 to be operational, which enables the additive delivery system 500 to operate if an additive has been selected by a user.

In FIG. 7, the outlet 252 of the housing 210 through which water from the second reservoir 230 flows is illustrated. The upper end or edge 254 of housing 210 has a curved and extended portion that forms part of the outlet 252. The outlet 252 is located adjacent to receiving area 350. As shown, the valve tips 524 and 574 have valves 425 and 475 located inside of them, respectively, that function to prevent water and additive in the receiving area 350 from entering the valve tips 524 and 574 when the water dispensing apparatus 200 is oriented vertically and is no longer used to pour water.

Figure 8:
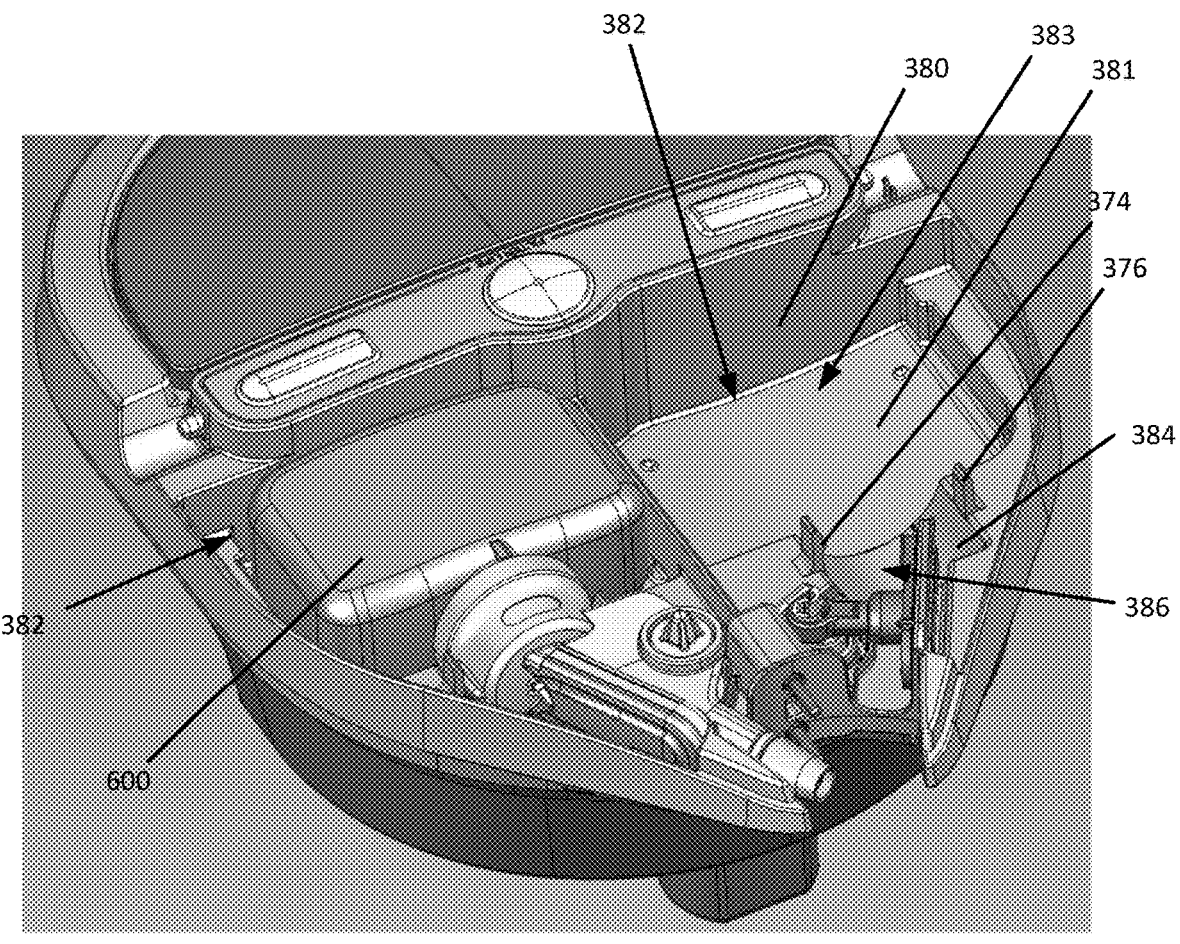

Turning to FIG. 8, regardless of its overall shape, the cover body 310 defines one or more receptacles 382, each of which can receive one of the additive assemblies 502 and 504. In the depicted embodiment, the receptacles 382 position the one or more additive assemblies 502 and 504 so that a pump module of each of the additive assemblies is coupled to actuating components disposed within the cover body 310. The additive assemblies 502 and 504 can be removably coupled to the cover body 310 via the one or more receptacles 382.

In this embodiment, the cover body 310 includes a first receptacle 382 configured to receive additive assembly 502 and a second receptacle 382 configured to receive additive assembly 504. Each of the receptacles 382 includes a first receptacle section or portion 383 and a second receptacle section or portion 386 (these sections are only labeled on one of the receptacles 382, but are representative of the sections of both receptacles 382).

Figure 9:
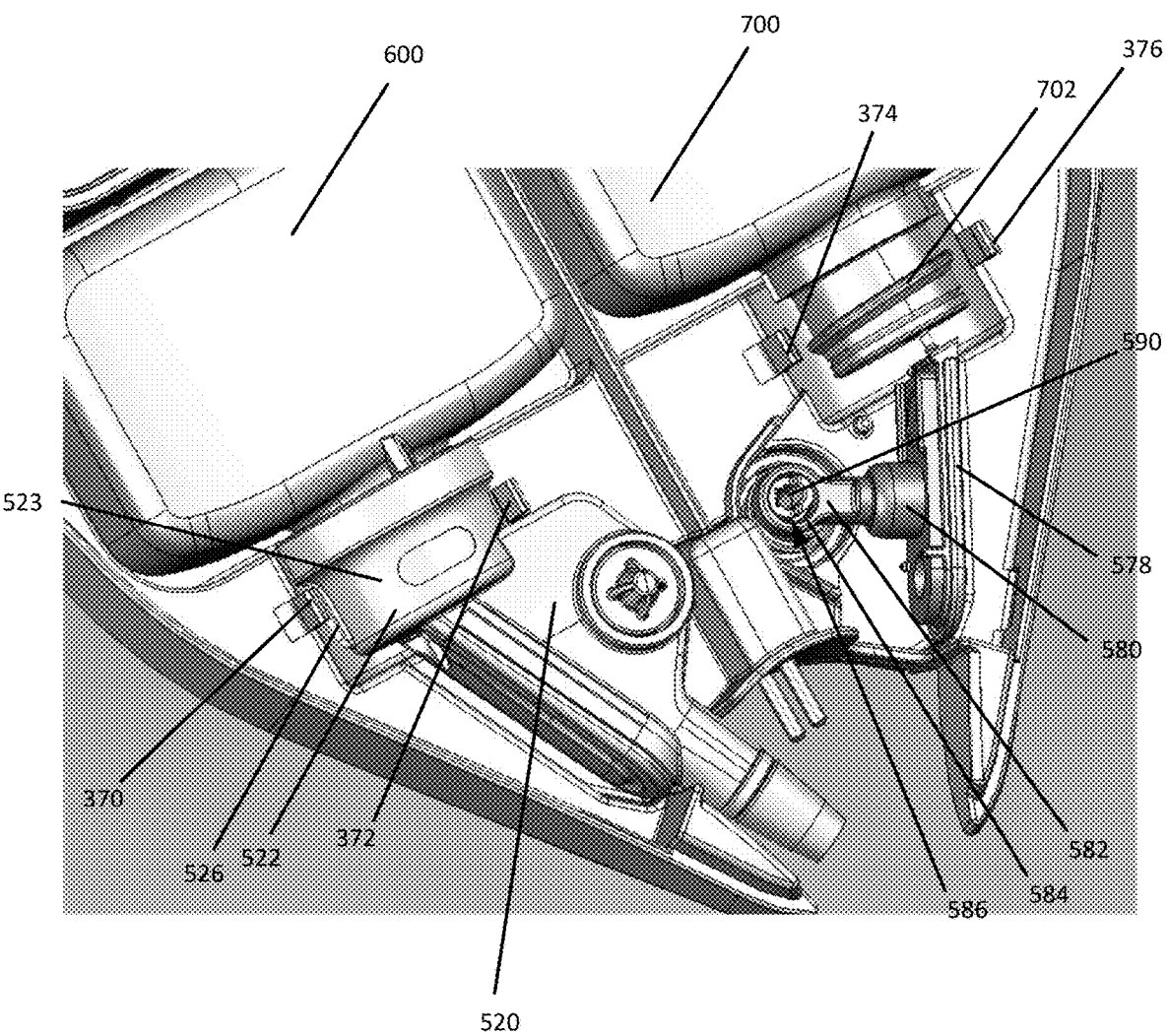

Referring to FIGS. 8 and 9, the first section 383 of each receptacle 382 is contoured to receive the additive vessel 600 or 700. The first section 383 is a cavity that is defined by a wall 380 and a lower surface 381. The respective second section 386 forms a snap fit with a portion of the nozzle housing of one of the additive assemblies. As shown in FIG. 8, the second section 386 is a cavity that is defined by a curved surface 384 that is sized to receive a coupling end of a nozzle housing. On opposite sides of the curved surface 384 are projections with inwardly facing coupling tabs 374 and 376.

Turning to FIG. 9, the cover body 310 includes a similar pair of projections with inwardly facing coupling tabs 370 and 372. The coupling end 522 of nozzle housing 520 has an outer surface 523 with a substantially cylindrical profile. On opposite sides of the outer surface 523 are tabs 526 that extend radially outwardly. Each of the tabs 526 is positioned so that it can be engaged by one of the coupling tabs 370 and 372. Thus, for example, a first vessel 600 (i.e., a tank or bottle or container) can be secured in the first receptacle 382 by pushing the coupling end 522 of the nozzle housing 520 into the second receptacle section 386 until the tabs 526 on coupling end 522 are engaged by the coupling tabs 370 and 372. Likewise, the second vessel 700 can be secured in the second receptacle 382 by pushing the coupling end of the nozzle housing 570 into the second receptacle portion 386 until the tabs 526 on the coupling end 522 are engaged by the coupling tabs 374 and 376.

In other embodiments, any desirable connection(s) or feature(s) could be used to removably secure one or more additive assemblies 502 and 504 to the cover body 310 and/or to connect one or more additive assemblies 502 and 504 to actuating components disposed within the cover body 310.

Referring to FIG. 9, the nozzle housing 570 has been removed from additive assembly 504, thereby revealing the associated pump 580. The following description of some of the features of the pump module 560 also applies to the pump module 510 as well. As shown, the pump module 560 includes a pump 580, which in this embodiment, is a cup diaphragm pump. The pump 580 includes an arm 582 with a loop 584 at one end that defines an opening 586. The opening 586 is sized to receive an eccentric shaft 590. As the eccentric shaft 590 moves, its movement causes the arm 582 of the pump 580 to reciprocate back and forth, thereby drawing additive out of the vessel 700 and then forcing the drawn additive out through the tip of the nozzle housing 570, with each cycle. Proximate to the pump 580 is a nozzle lid 578 that functions with the pump 580 to direct additive material from the vessel 700 to the valve tip.

Figure 9A:
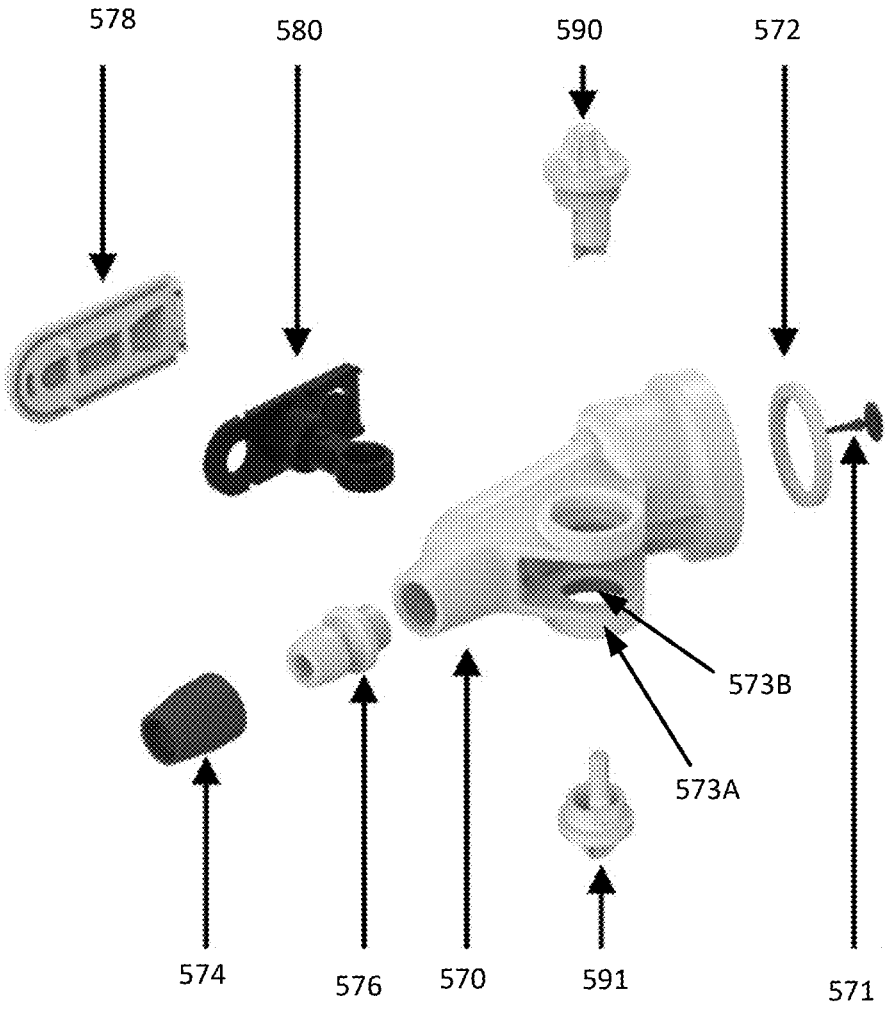
FIG. 9A is an exploded perspective view of various components of the water dispensing apparatus illustrated in FIG. 3.

Referring to FIG. 9A, an exploded perspective view of various components of the water dispensing apparatus 200 is illustrated. This view shows several components illustrated in FIG. 9 in a different orientation. In this view, the nozzle housing 570 includes a pair of flanges 573A with openings 573B into which female eccentric shaft 590 and male eccentric shaft 591 are mounted for rotation. At one end of the nozzle housing 570 is an opening into which a valve nozzle adapter 576 is mounted. Coupled to one end of the valve nozzle adapter 576 is valve tip or valve nozzle 574. Coupled to the other end of the nozzle housing 570 is a gasket 572 and a scaling umbrella that engages with vessel 700 to which nozzle housing 570 is coupled. Also shown in FIG. 9A are a pump or cup diaphragm 580 and a nozzle lid 578. Screws 833 and 834 rotate when either gear 820 or gear 822 rotates, thereby causing the gear coupling assembly to rotate. The eccentric shafts of the bottle assemblies are mated to the gear couplings 870 and 872. When eccentric shafts 590 and 591 are rotated, they move the ring of the cup diaphragm 580 in an elliptical motion, causing the pump to pull out and move back in, opening and closing the diaphragm pump.

Figure 10:
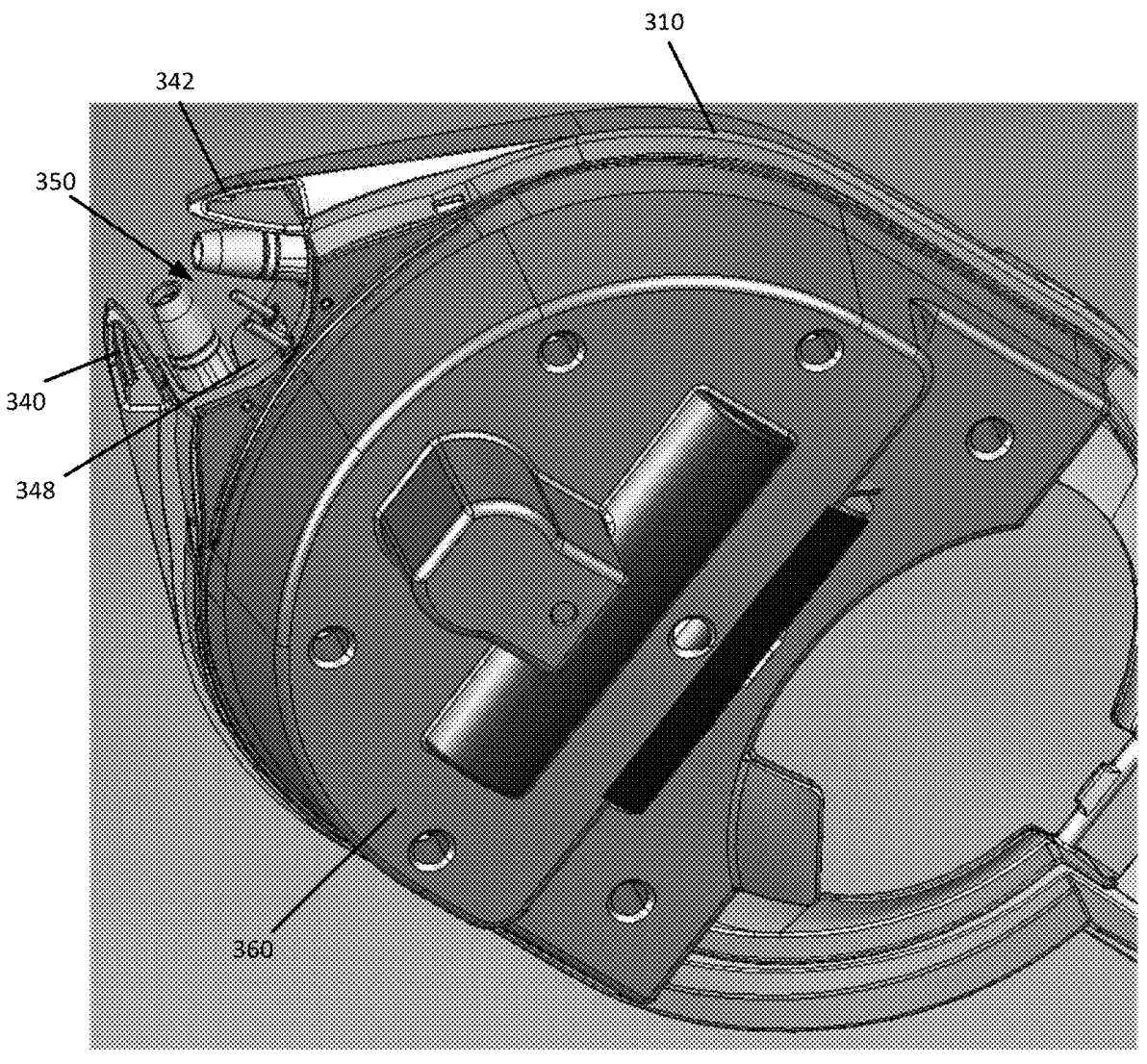
FIGS. 10-11 are close-up bottom perspective view of various components of the water dispensing apparatus illustrated in FIG. 3.

Referring to FIG. 10, a bottom perspective view of components of the water dispensing apparatus 200 is shown. In this embodiment, the cover body 310 includes a bottom housing 360 coupled to the lower surface of the cover body 310. The bottom housing 360 can be coupled to the cover body 310 via fasteners such as screws. In this view, the receiving area 350 defined by arms 340 and 342 and wall 348 is illustrated.

Figure 11:
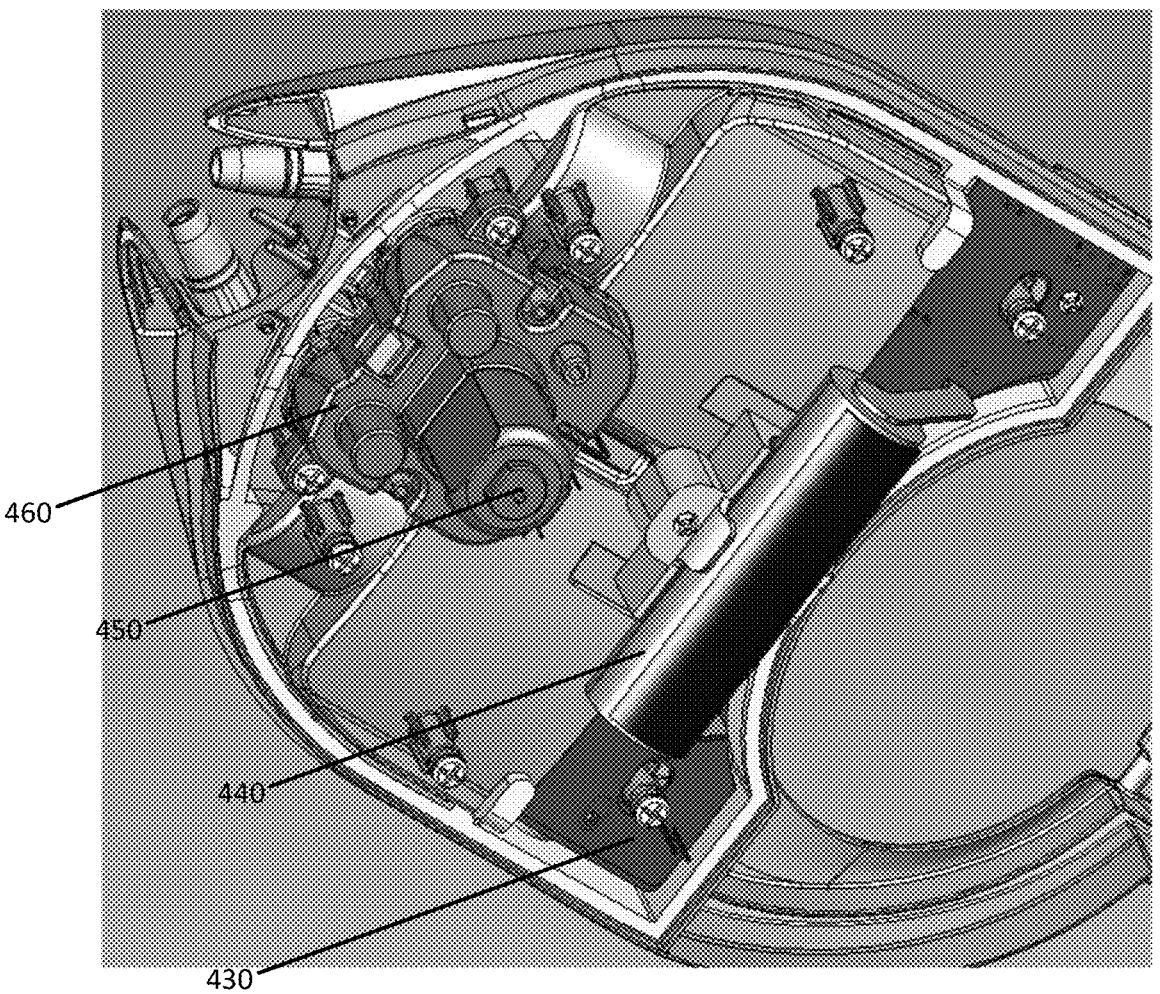

Turning to FIG. 11, the bottom housing 360 has been removed from the cover body 310. As a result, several of the electronic components are visible. In this embodiment, a rechargeable battery 440 is connected to a PCB 430 that controls the functions of the water dispensing apparatus 200. The PCB 430 is connected to a motor or drive 450 that actuates and drives a gear arrangement, which is described below. The gear arrangement is located beneath the gear box bottom housing 460.

Figure 11A:
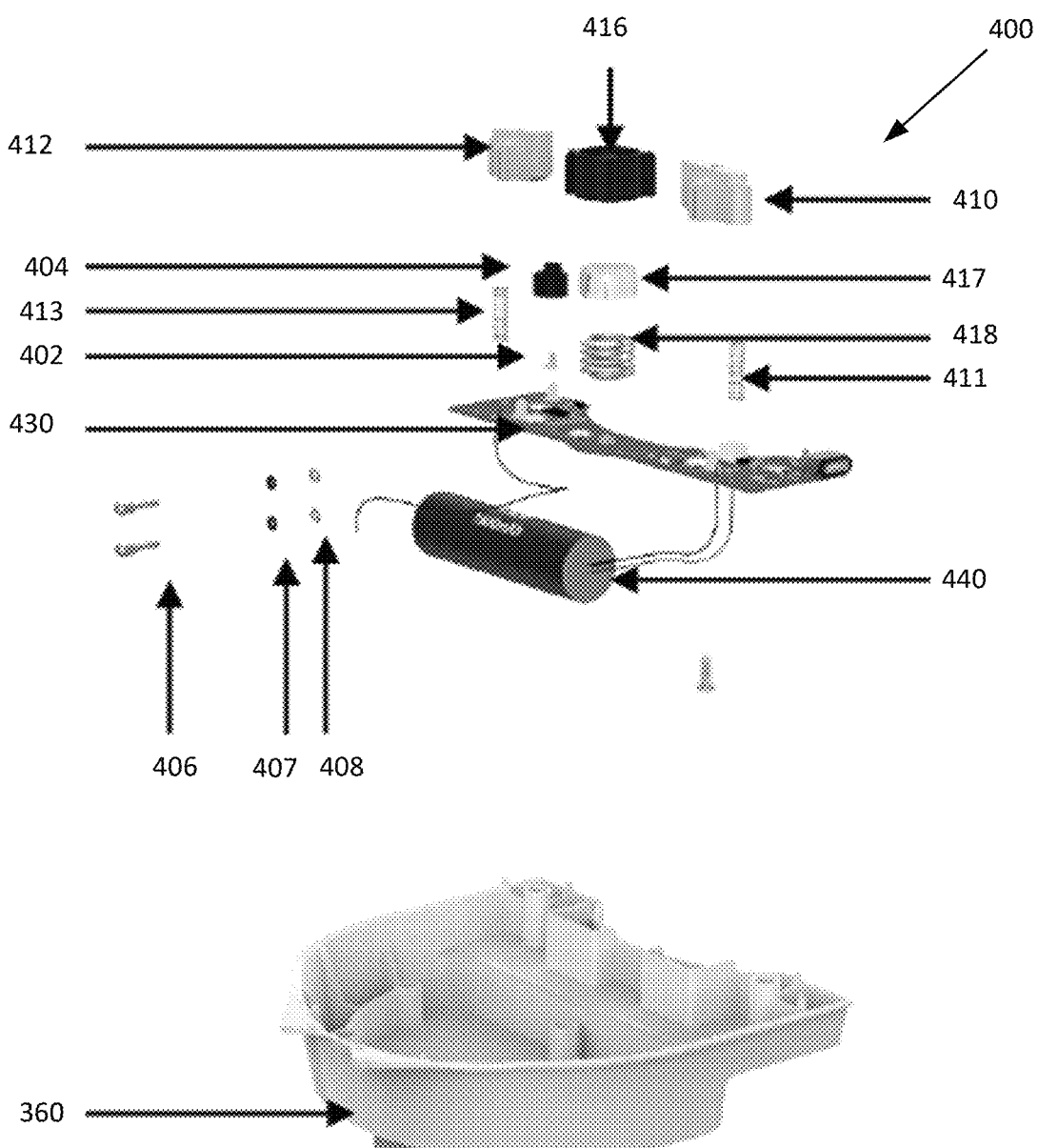
FIG. 11A is an exploded perspective view of various components of the water dispensing apparatus illustrated in FIG. 3.

Referring to FIG. 11A, an exploded perspective view of various components of the water dispensing apparatus 200 is illustrated. As shown, various components of the electronic portion 400 are located in a cavity defined by bottom housing 360. The electronic portion 400 includes a battery 440 and a PCB 430. The selector buttons 410 and 412 are biased to their opened or non-engaged positions by biasing members or springs 411 and 413, respectively. The filter indicator 414 includes an indicator light isolator 416, an indicator light diffuser 417, and an indicator light isolator spring 418. Also included are a hole seal 402 and a seal 404, as well as a resistance probe pin 406, a pin O-ring 407, and a pin c-clip 408.

Figure 12:
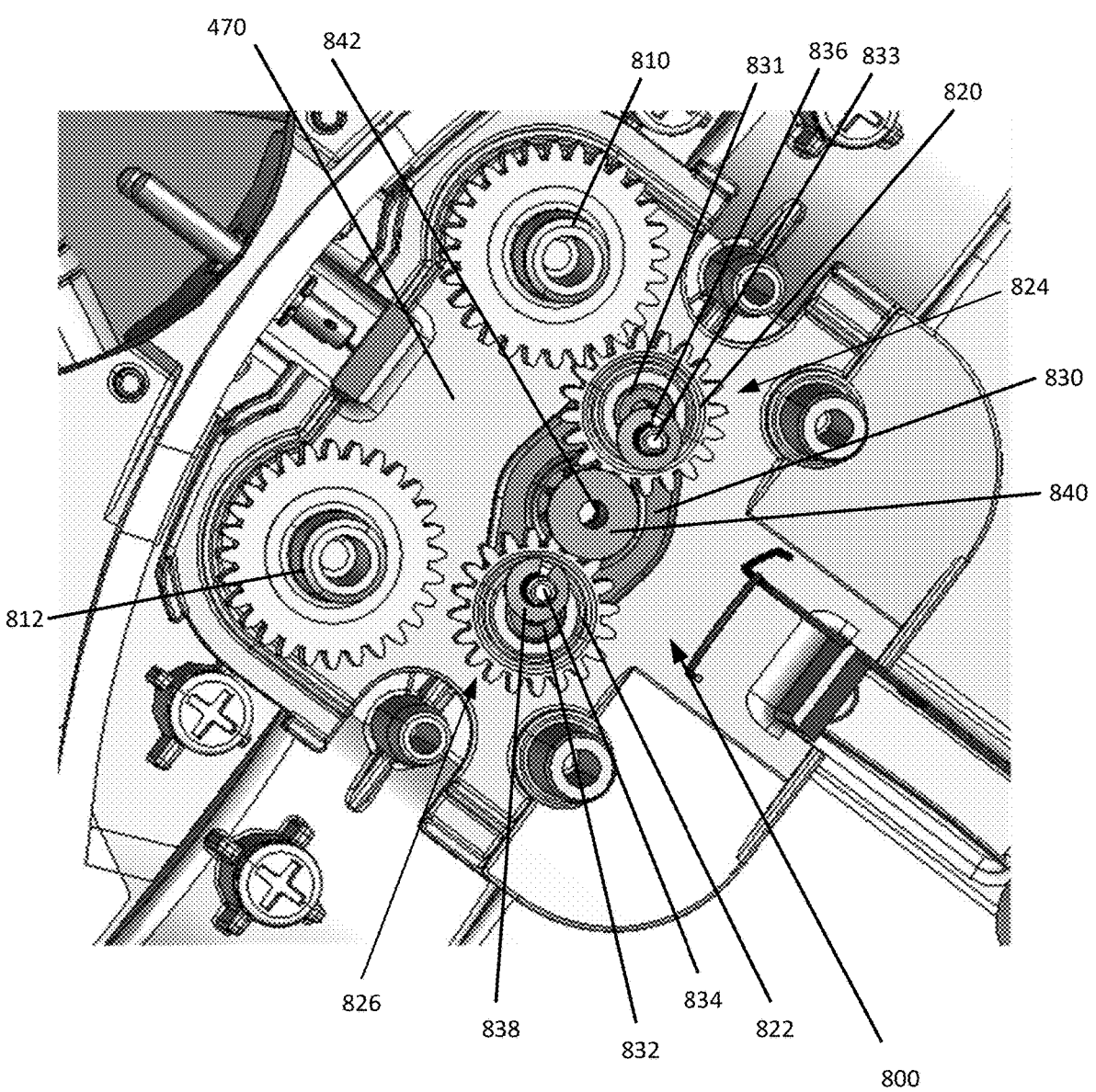
FIGS. 12-13 are close-up bottom perspective view of various components of the water dispensing apparatus illustrated in FIG. 3.

Turning to FIG. 12, the gear box bottom housing 460 has been removed, thereby rendering additional components of the gear arrangement 800 visible. Also, FIG. 12 illustrates the gear box top housing 470. In this embodiment, the gear arrangement 800 includes a pinion gear 840 that is connected to an output of the motor 450. The pinion gear 840 rotates about an axis extending through the center hole 842 of the pinion gear 840. The gear arrangement 800 includes a planetary gear carrier 830 that has a small range of rotational movement about an axis extending through the center hole 842. The planetary gear carrier 830 includes a pair of posts 831 and 832 at opposite ends of the carrier 830. The posts 831 and 832 have planetary gears 820 and 822 mounted thereon, respectively. The teeth of each of the planetary gears 820 and 822 are engaged with the teeth of the pinion gear 840. Thus, as the motor 450 drives and rotates the pinion gear 840, the pinion gear 840 rotates both of the planetary gears 820 and 822.

The gear arrangement 800 also includes a pair of rotatably mounted driver gears 810 and 812. Depending on which additive is selected by a user, the planetary gear carrier 830 is rotated by the motor 450 so that one of the planetary gears 820 or 822 is engaged with a corresponding one of the driver gears 810 and 812. Each of the planetary gears 820 and 822 is disposable in an engaged position 824 and in a disengaged position 826, and due to the structure of the planetary gear carrier 830, the planetary gears 820 and 822 are alternatively in their engaged position 824 and disengaged position 826. In other words, when planetary gear 820 is in its engaged position 824, planetary gear 822 is in its disengaged position 826. Similarly, when planetary gear 822 is in its engaged position 824, planetary gear 820 is in its disengaged position 826. In FIG. 12, planetary gear 820 is in an engaged position 824 in which the teeth of planetary gear 820 are engaged with the teeth of driver gear 810. Thus, in this orientation, the motor 450 drives the pinion gear 840, planetary gear 820, and driver gear 810, which results in additive from vessel 700 being dispensed from pump module 560. Due to the configuration of the planetary gear carrier 830, when planetary gear 820 is in its engaged position 824, planetary gear 822 is in its disengaged position 826 in which the teeth of planetary gear 822 do not engage the teeth of driver gear

812. When the planetary gear carrier 830 is rotated from the position illustrated in FIG. 12, the planetary gear 822 is moved to its engaged position 824 into engagement with driver gear 812, and planetary gear 820 is moved to its disengaged position 822 out of engagement with driver gear 810. In this orientation, when planetary gear 822 is rotated, additive from vessel 600 is dispensed from pump module 510. In this embodiment, planetary gears 820 and 822 have screws 833 and 834, respectively, and washers 836 and 838, respectively.

Figure 13:
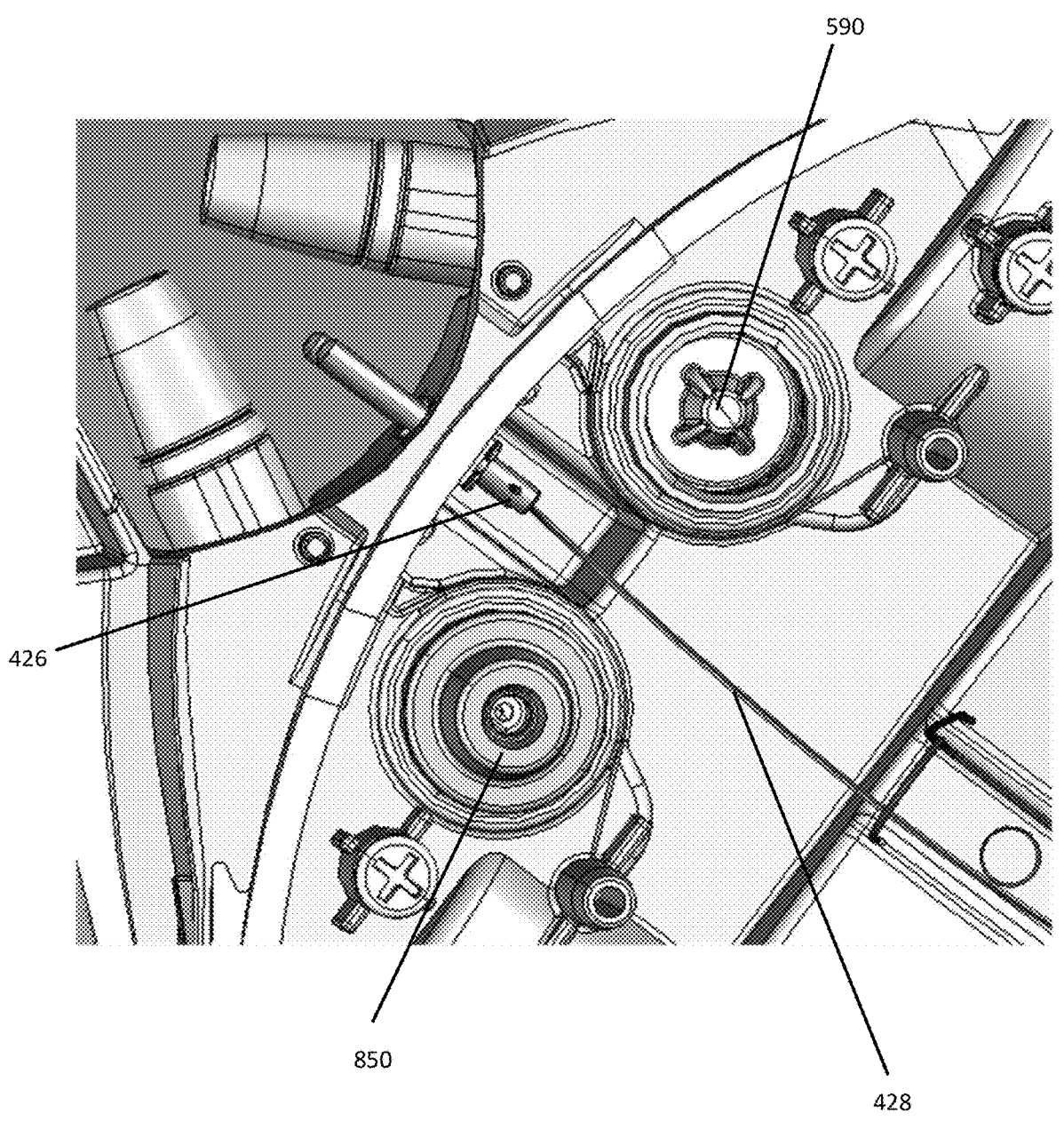

Turning to FIG. 13, additional gear arrangement components illustrated in FIG. 11 have been removed, thereby rendering other components visible. As shown, the sensor unit 420 includes a sensor component 426 that is connected to a signal line 428 that carries the signal from the sensor component 426 to the PCB 430. In addition, the driver gears 810 and 812 have been removed in FIG. 12. Each of the driver gears 810 and 812 is proximate to a gear box seal 850, a gear coupling (not shown), and a respective eccentric shaft (shaft 590 being illustrated in FIG. 12).

Figure 13A:
FIG. 13A is an exploded perspective view of various components of the water dispensing apparatus illustrated in FIG. 3.
Figure 13A:
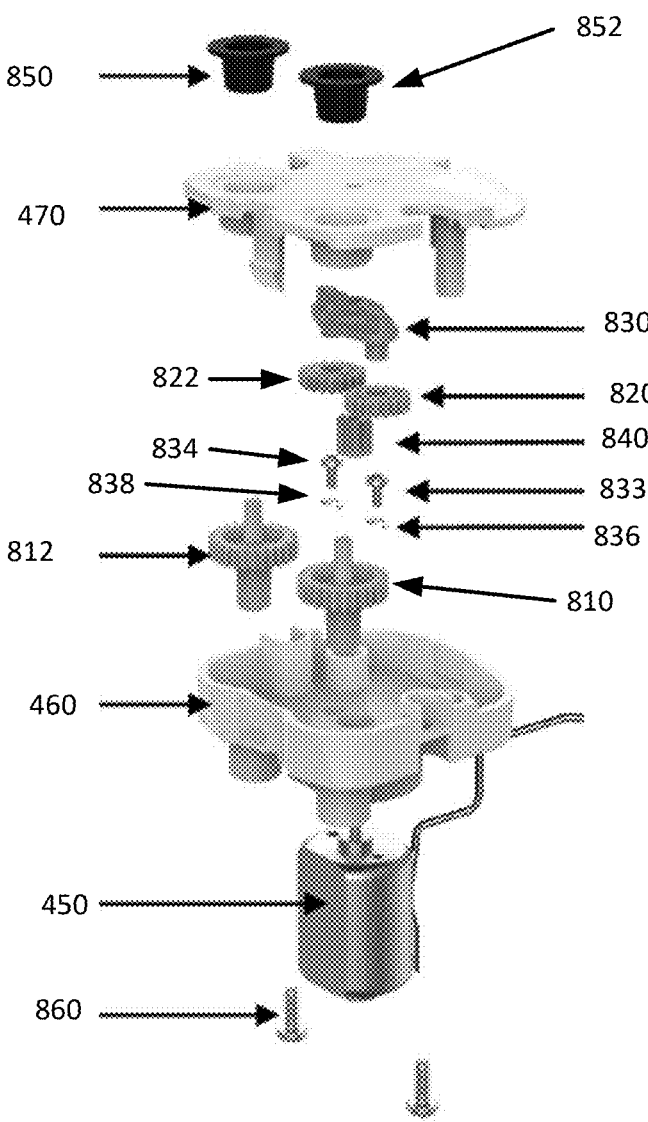

Referring to FIG. 13A, an exploded perspective view of various components of water dispensing apparatus 200 is illustrated. As shown, located between gear box bottom housing 460 and gear box top housing 470 are planetary gear carrier 830, planetary gears 820 and 822, pinion gear 840, screws 833 and 834, washers 836 and 838, and driver gears 810 and 812. The drive mechanism also includes a pair of gear box seals 850 and 852 and a pair of gear couplings 870 and 872. The gear box bottom housing 460 and the gear box top housing 470 are coupled together by one or more fasteners 860, such as screws. The drive 450 is also illustrated relative to the gear box bottom housing 460.

Figure 14:
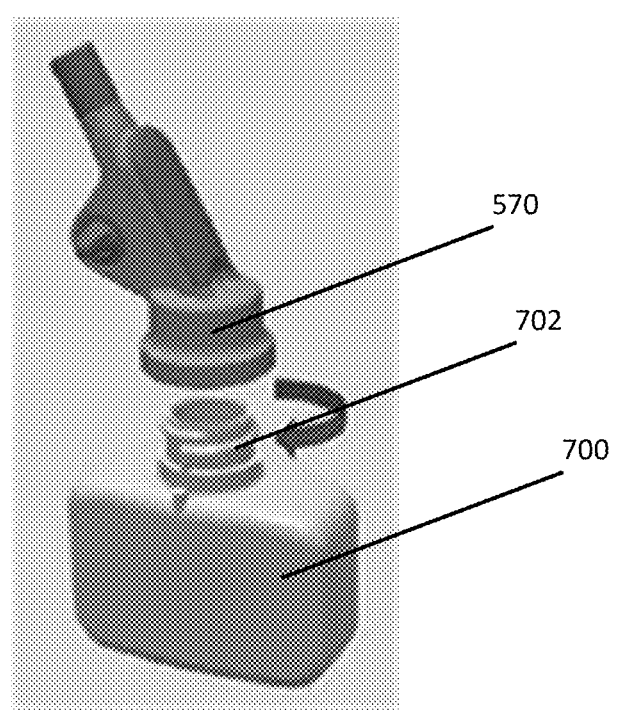
FIGS. 14 and 15 are perspective views of some of the components of the water dispensing apparatus illustrated in FIG. 3 showing a few assembly steps.
Figure 15:
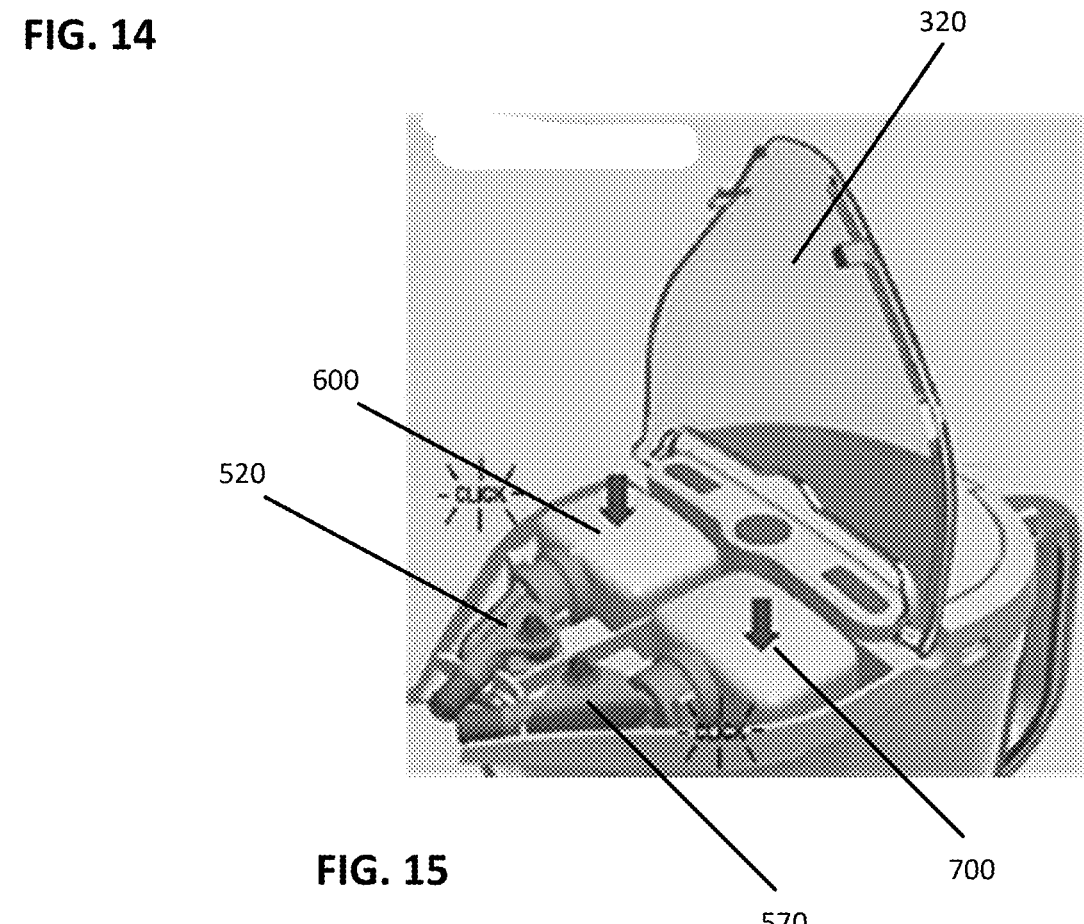

Referring to FIGS. 14 and 15, a few exemplary steps of setting up the water dispensing apparatus are illustrated. In FIG. 14, prior to pump module 560 being inserted into the cover body 310, nozzle housing 570 is coupled to additive vessel 700 via threaded end 702, which includes threads on a neck that engage threads on the inside of the nozzle housing 570. In FIG. 15, lid 320 has been pivoted to its open position, thereby allowing a user to insert nozzle housing 520 and vessel 600 and to insert nozzle housing 570 and vessel 700. Each of those sets is snapped into place and retained therein.

Figure 16:
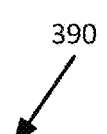
FIG. 16 is a schematic illustration of additive dispensing techniques that may be implemented with the apparatuses and systems presented herein.
Figure 16:
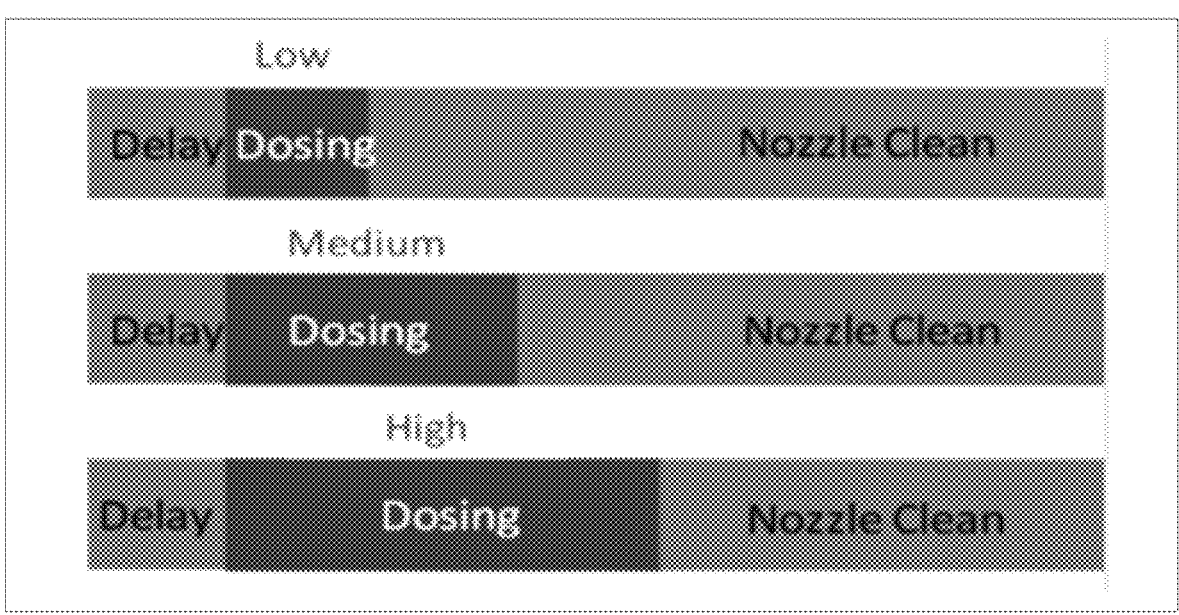

Now turning to FIG. 16, the sensors 422 and 424 enable the additive delivery system 500 to execute certain dosing routines. Diagram 390 illustrates one such set of routines. Each routine is started when the one or more sensors 422 and 424 detect the presence of water in receiving area 350 and outlet 252 of a water dispensing apparatus 200. The routine to be executed is selected based on user actuations of selector buttons 410 and 412. The routines continue as long as water is still sensed by the sensors 422 and 424, but will stop when the sensors 422 and 424 no longer sense water for a threshold period of time (e.g., to prevent false stops). Thus, if pouring stops, the additive delivery system 500 will stop dispensing, will reset, and will prepare to start a new routine (and new dispensing of additive), e.g., based on the current or last used settings.

As an example of a routine, if a user has selected a "low" dosing level of additive, the additive delivery system 500 may execute the low dosing routine (the top routine in diagram 390). With this routine, the additive delivery system 500 will start dispensing an additive (from any "on" removable additive assemblies) a short time after sensing water in the spout, e.g., one second or less. The short delay may ensure that at least some water is dispensed prior to introduction of an additive. This may establish a base of water in a container (e.g., a cup) into which the additive can mix when added to the container. Additionally, this delay may ensure that the additive dispensing (i.e., "dosing") occurs while the spout is covered in water, which may prevent, or at least discourage, the additive from adhering to the spout while also maximizing the mixing of the additive into the water.

After the delay, the additive dispensing (i.e., "dosing") will last a predestined amount of time that is correlated with a certain volume of additive (e.g., 1 mL). Then, the additive will stop being dispensed and the remainder of the pour will serve to clean any nozzles that dispensed additive. As a specific example, pouring approximately 250 mL of water may take approximately 5 seconds and dosing 1 mL of additive may span approximately 0.67 seconds of the approximately 5 second pour. On the other hand, if the additive delivery system 500 executes a second ("medium") level of dosing or a third ("high") level of dosing, the routine will be substantially similar, except that the predestined amount of time will be correlated different volume of additive (e.g., 2 mL and 3 mL, respectively). In some instances, the low dosing may provide a hint of flavor, the medium dosing may provide full flavoring, and the high dosing may provide heavy flavoring. Advantageously, even with higher levels of additive dosing, there is still sufficient rinsing time to clean the nozzle.

In some instances, if the additive delivery system 500 is dispensing additives from two additive assemblies 502 and 504 into a stream of water, the dosing may be adjusted to ensure that the total amount of additive introduced into a water stream is equivalent to the desired dosage. For example, if two additive assemblies 502 and 504 are adding two flavorings to a stream of water to create a mixed flavor, the additive delivery system 500 may deliver a half-dose from each of the two additive assemblies 502 and 504 to execute the "low" routine. Alternatively, in some instances, the dosing will not be adjusted to ensure that the total amount of additive introduced into a water stream is equivalent to the desired dosage. Instead, the additive delivery system 500 will cause each "activated" additive assembly to dispense a dosage according to the selected routine (e.g., 1 mL per removable additive delivery system 500 when executing the "low" routine). In either scenario, an end user will be able to easily customize the additive introduction by selecting specific additives and/or by selecting levels of dosage.

Figure 17:
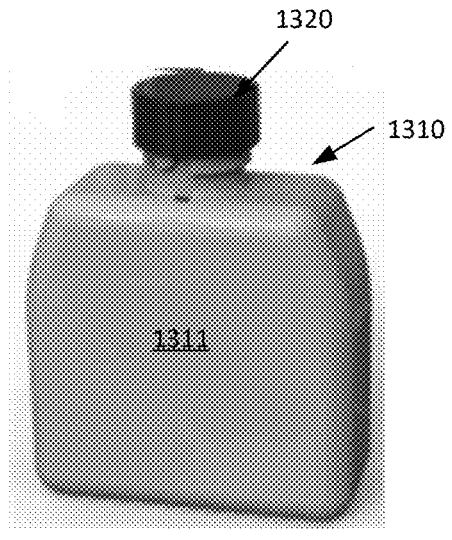
FIG. 17 is a perspective view of an embodiment of a vessel that can be used with the water dispensing apparatus illustrated in FIG. 3, according to an example embodiment, the vessel being depicted with a first closure coupled thereto.
Figure 18:
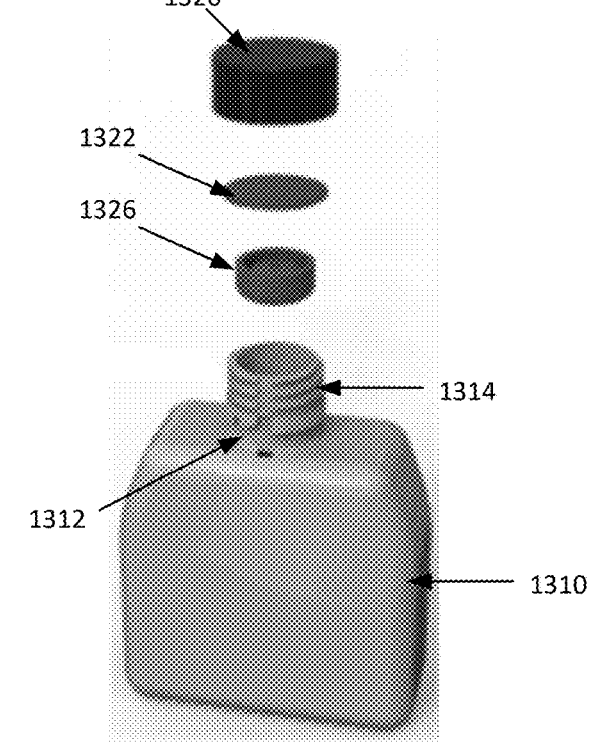
FIGS. 18 and 19 are exploded perspective views of the vessel illustrated in FIG. 17 with alternative closures or connectors coupled thereto.
Figure 19:
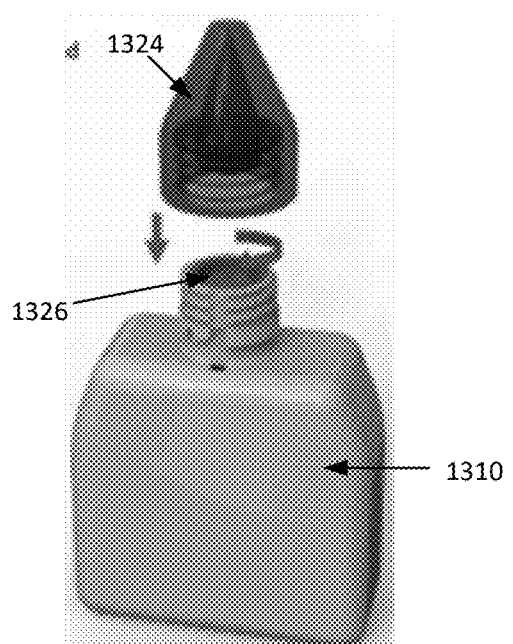

Now turning to FIGS. 17-19, these figures depict an example embodiment of a vessel 1310 that may be included in the additive assemblies 502 and 504 presented herein. As can be seen, the vessel 1310 includes a storage compartment 1311 that defines an interior volume for storing an additive. As an example, the storage compartment 1311 may define an interior volume in the range of approximately 30 milliliters (mL) to approximately 45 mL (e.g., so that the vessel 1310 can dispense at least 41 mL). Regardless of its size, the storage compartment 1311 has an outlet 1312 through which the additive may exit the storage compartment 1311. In some instances, the outlet 1312 may be sealed prior to incorporating the vessel 1310 into additive assembly 502 or 504, for example, to facilitate manufacturing processes and/or so that a user can use the vessel 1310 independent of the additive delivery system 500 presented herein if desired.

More specifically, the outlet 1312 may include a slotted thread 1314 that allows different closures to connect to the storage compartment 1311 in different manners. For example, as is shown in FIGS. 17 and 18, a first closure 1320 (e.g., a plug-style closure) can be threaded onto slotted thread 1314, with or without a foil seal 1322, to seal the storage compartment 1311. As another example, and as is shown in FIG. 19, the first closure 1320 may be removed to install a connector 1324 onto the slotted thread 1314 to connect the storage compartment 1311 to one of the pump modules presented herein (to be clear, the connector 1324 shown in FIG. 19 is merely representative of a connection to a nozzle housing or a pump module of the present application). Still further, as is shown in FIGS. 18 and 19, either the first closure 1320 or the connector 1324 can be used in combination with an insert 1326 that, for example, may restrict the flow rate at which an additive may move through the outlet 1312 (however, the insert 1326 might only be used with the first closure 1320 to ensure it is present when the connector 1324 is installed on the outlet 1312).

FIGS. 20-25 illustrate additional embodiments of vessels that may be used to execute the techniques presented herein. These additional embodiments may be similar to each other and to vessel 1310 and, thus, are labeled with like or similar reference numerals. Consequently, for brevity, these additional embodiments are only briefly described to note clear differences, but the limited discussion should not be construed as limiting in any manner. For example, if a difference between embodiments is not described, such an omission should not be construed as limiting. Still further, it should be clear that any changes or variations shown in one embodiment could be included in any other embodiment presented herein.

Figures 20, 21, 22:
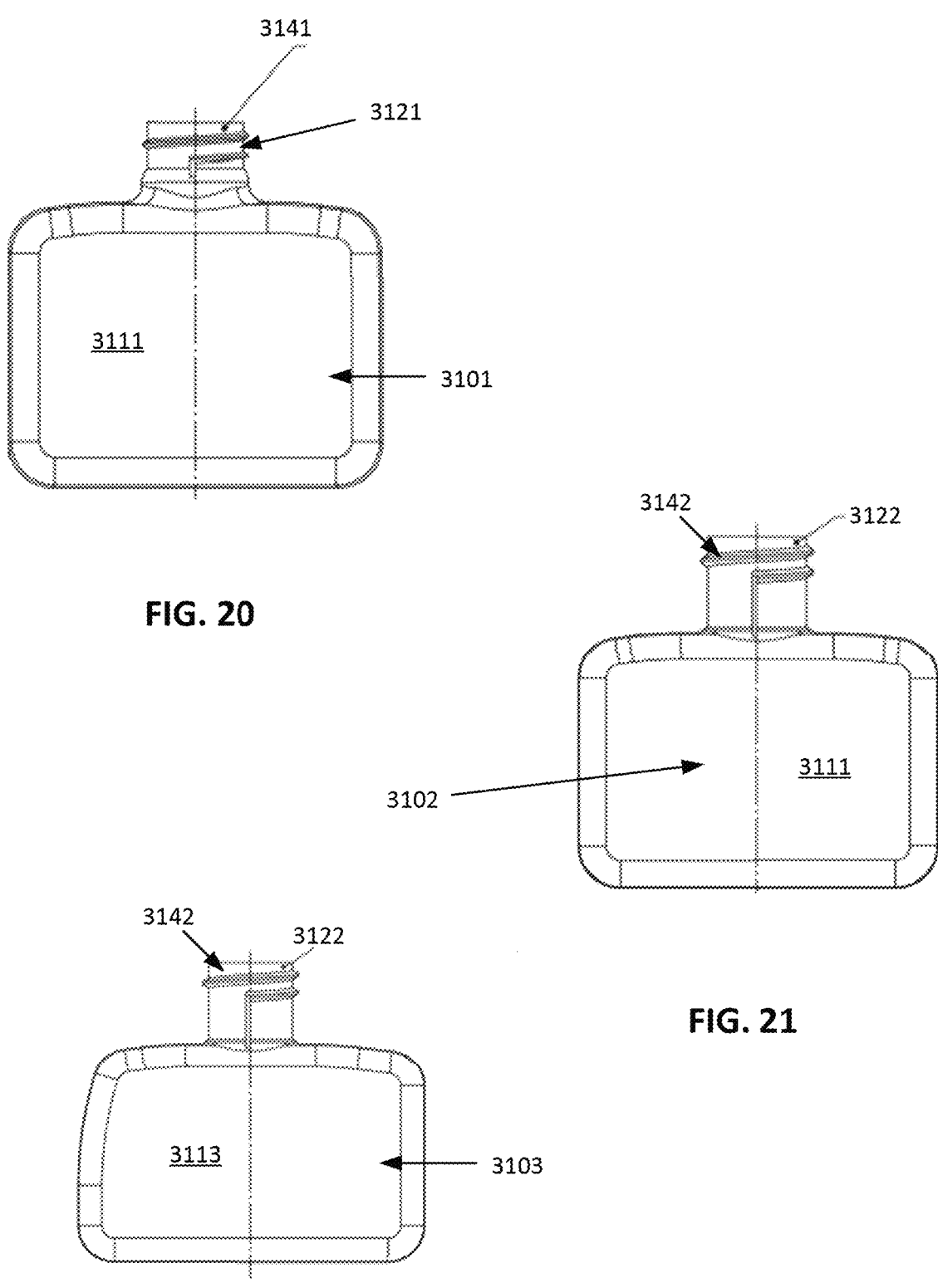
FIGS. 20-22 are front views of additional embodiments of a vessel that can be used with the water dispensing apparatus illustrated in FIG. 3.

That said, in FIG. 20, the vessel 3101 is a tank-style vessel like vessel 1310, but it includes a storage compartment 3111 that is expanded as compared to the storage compartment 1311 of FIGS. 17-19. The storage compartment 3111 also has a different external shape, but is still symmetrical like storage compartment 1311. In FIG. 21, the vessel 3102 is again a tank-style vessel like vessel 1310, and also includes an expanded storage compartment 3111 like vessel 3101. However, now, vessel 3102 includes an outlet 3122 with condensed threading 3142 as compared to threading 3141 included on the outlet 3121 of vessel 3101. For example, condensed threading 3142 may be an SPI 18-400 thread (18 mm diameter, 400 style of thread) or SPI 20-400 thread. Importantly, the condensed threading may create extra space (e.g., 5 mm of extra space) below the condensed threading 3142 to allow for a lock-and-key feature (e.g., a locking tab). Finally, in FIG. 22, vessel 3103 includes the same outlet 3122 with condensed threading 3142 as vessel 3102; but, vessel 3103 includes an asymmetrical storage compartment 3113.

Figures 23, 24:
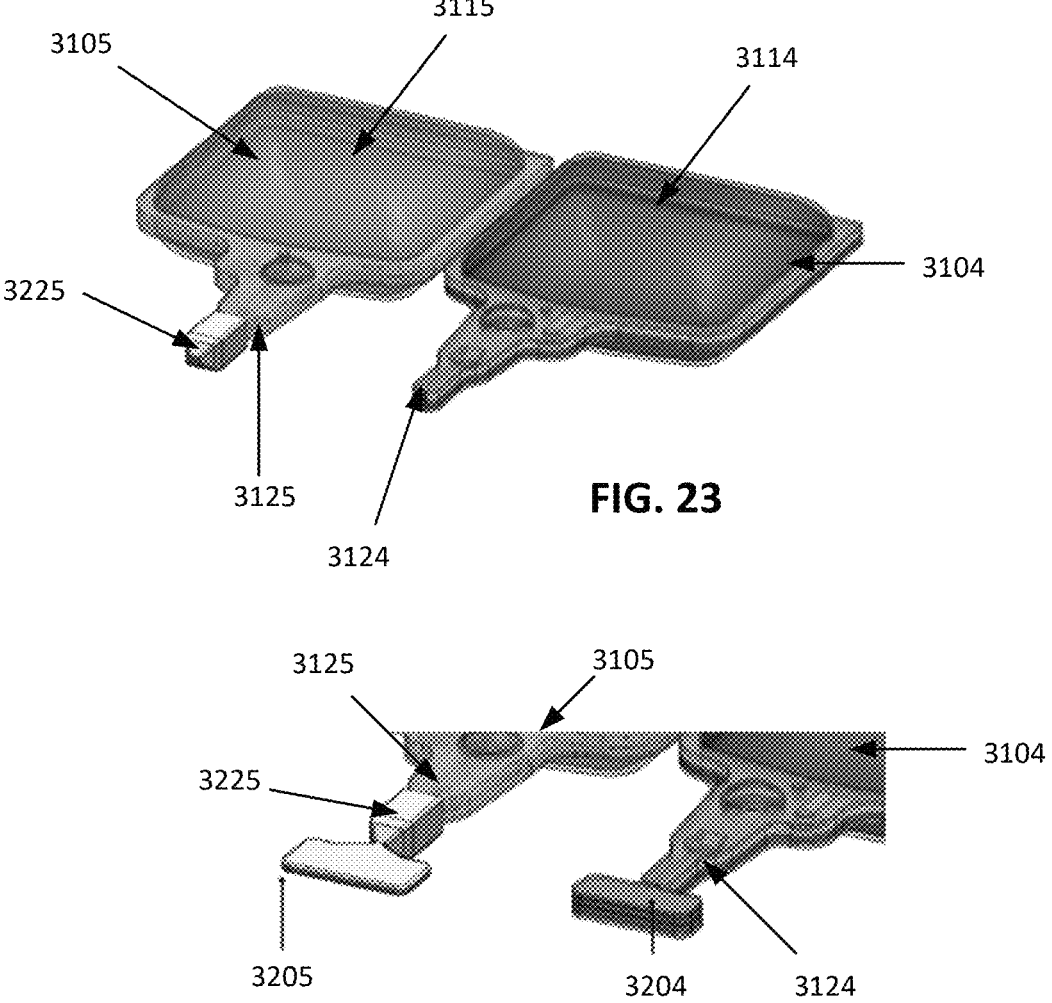
FIGS. 23 and 24 are top perspective views of still further embodiments of a vessel, in the form of a hybrid tank-pouch, that can be used with the water dispensing apparatus illustrated in FIG. 3, with closures or connectors coupled thereto.

In FIGS. 23 and 24, the illustrated vessel embodiments resemble tank-style embodiments, but may actually be soft or flexible and may more resemble pouches. That is, vessel 3104 and vessel 3105 may be hybrid tank-pouch embodiments, e.g., formed by web converted construction of thin-film laminated layers, with the layers forming or defining fluid paths and storage compartments 3114 and 3115, respectively. In fact, in some embodiments, vessel 3104 and vessel 3105 may each define a pump dome or "bubble" that can act as a pump. Alternatively, vessel 3104 and vessel 3105 can be coupled to a pump module. Either way, as is depicted, vessel 3104 and vessel 3105 may be sealed by first closures 3204 and 3205, respectively, which may be snapped or cut off to open outlet 3124 or outlet 3125, respectively. As is shown, in some instances, an outlet of this embodiment may be capped with a dispensing or connecting element, which is generally noted by reference number 3225. This element may act as a nozzle to connect the vessel 3105 to a pump module. However, as is shown by vessel 3104, this embodiment need not include such an element between the first closures 3204 and the open outlet 3124.

Figure 25:
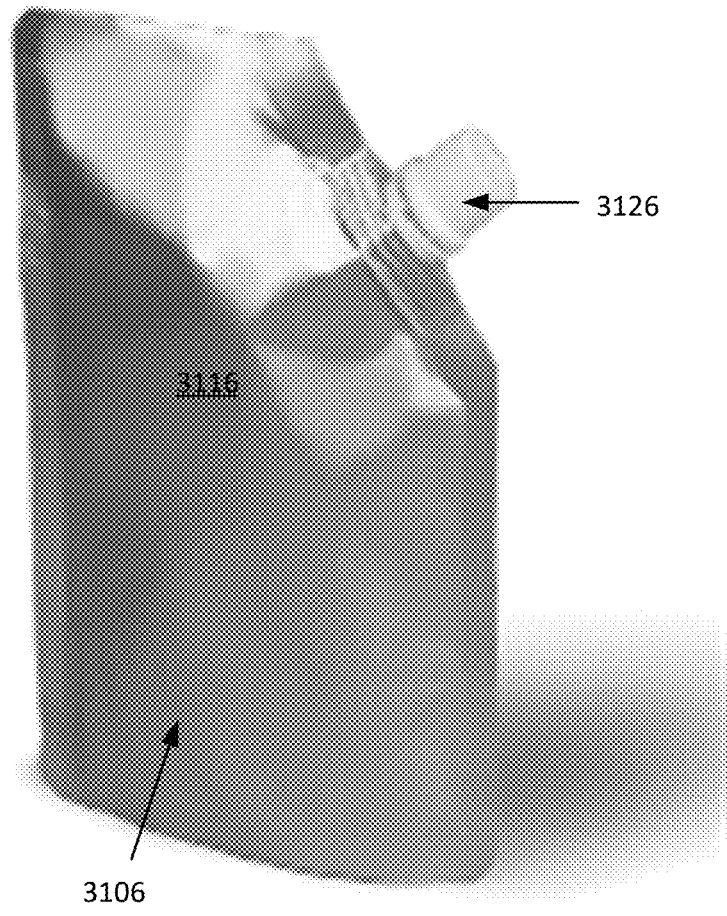
FIG. 25 is a side perspective view of yet another embodiment of a vessel, in the form of a pouch, that can be used with the water dispensing apparatus illustrated in FIG. 3.
Figure 30:
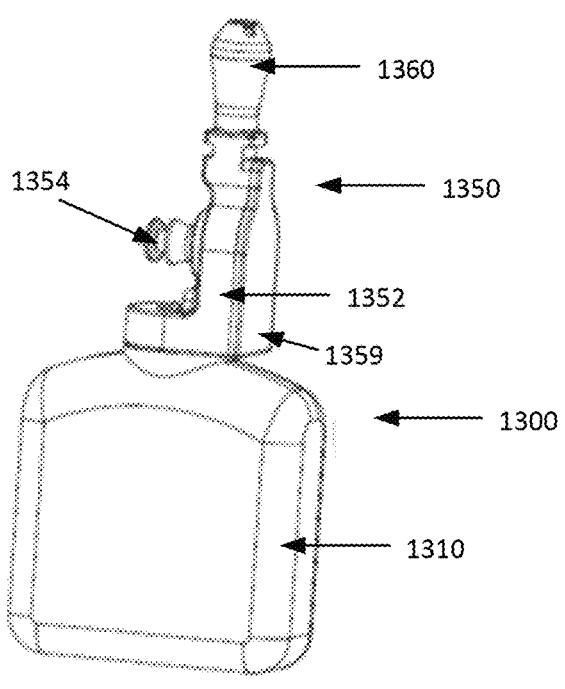
FIG. 30 is a perspective view of an alternative embodiment of a pump module connected to the vessel illustrated in FIG. 26 to form a removable additive assembly for use with the water dispensing apparatus illustrated in FIG. 3.
Figure 31:
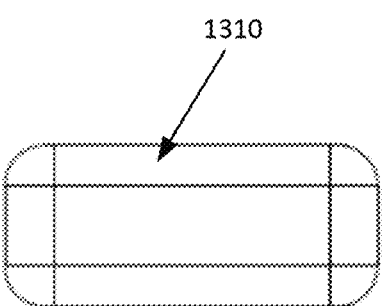
FIG. 31 is a bottom view of the removable additive assembly of FIG. 30.
Figure 32:
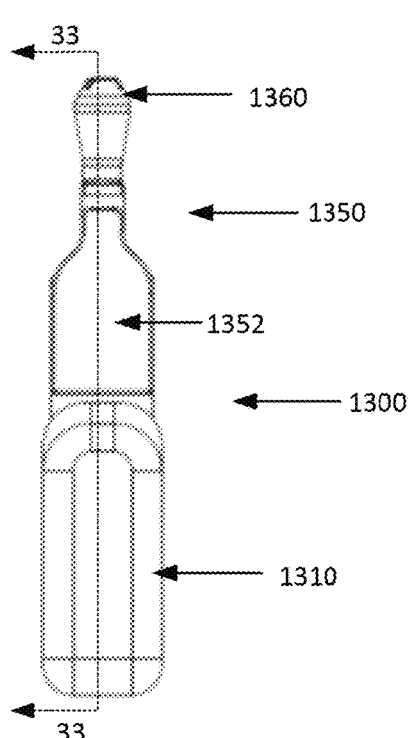
FIG. 32 is a side view of the removable additive assembly of FIG. 30.
Figure 33:
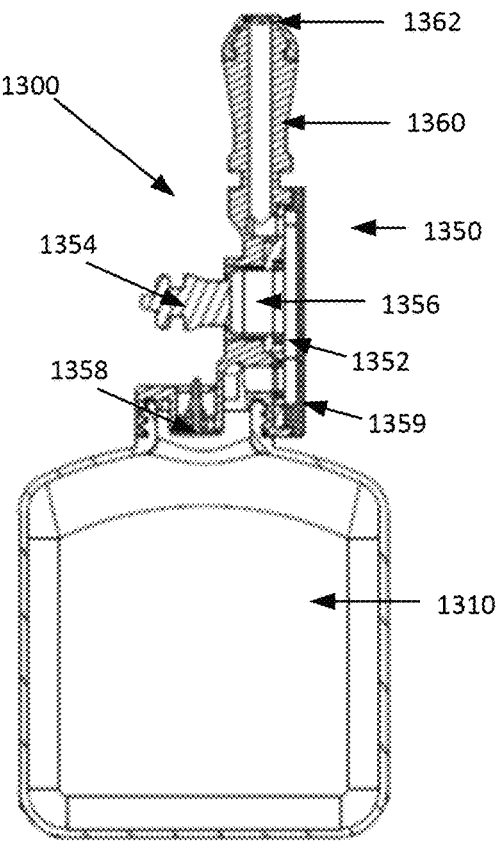
FIG. 33 is a cross-sectional front view of the removable additive assembly of FIG. 30 taken along line "33-33" in FIG. 32.

Now turning to FIG. 25, in some embodiments, the vessel may be a pouch-style vessel, as is represented by vessel 3106. With a pouch-style vessel, sidewalls of the vessel 3106 may be configured to expand (i.e., may be flexible) to define an interior volume within the storage compartment 3116. This expansion/flexibility may be achieved in any manner now known or developed hereafter. Meanwhile, the vessel 3106 may include a relatively rigid outlet 3126 to ensure that the outlet 3126 remains open while the vessel 3106 is squeezed or otherwise manipulated (e.g., physically or with suction) to dispense it contents. Also, although not depicted, the outlet 3126 can include threading (e.g., like slotted thread 1314 and/or condensed threading 3142).

FIGS. 26-33 provide additional view of the vessel 1310, alone or connected to pump module 1350. Specifically, FIGS. 26-29 provide a front perspective view, a bottom view, a side view, and a sectional view, respectively, of the vessel 1310 of FIGS. 17-25. As can be seen in these Figures, a central axis 1330 of the outlet 1312 is aligned with a center of the storage compartment 1311 in this embodiment. Meanwhile, FIGS. 30-33 provide a front perspective view, a bottom view, a side view, and a sectional view, respectively, of vessel 1310 while connected to the pump module 1350 of FIGS. 17-25. As mentioned (and as can be seen in at least FIG. 33), the pump module 1350 includes a nozzle 1360 and a pump 1352. The nozzle 1360 extends from the pump 1352 to a distal end. In some embodiments, the nozzle 1360 is formed integrally with the pump 1352. Alternatively, the nozzle 1360 and pump 1352 may be manufactured separately together and coupled together, such as with a process that forms an irremovable coupling (e.g., ultrasonic welding or other similar processes).

The pump 1352 connects the pump module 1350 to the vessel 1310 via a connection 1358 and defines a pump chamber 1356 between connection 1358 and the nozzle 1360. The actuator 1354 is disposed adjacent one lateral edge of the pump chamber 1356 and, in some embodiments, is or includes a diaphragm. Alternatively, the actuator 1354 may be coupled to a diaphragm or another such pumping mechanism (e.g., a piston). However, a diaphragm may be preferred since a diaphragm can reliably operate with minimal structural/mechanical requirements (e.g., minimal parts, no bearings or oil needed, etc.) and minimal maintenance. Diaphragm pumps are also accurate and, thus may allow the pump 1352 to deliver the same dosage or micro-dosage (i.e., amount) each time the pump is actuated, for example, to ensure that a user meets daily vitamin and other enhancement requirements. In at least some embodiments, the pump 1352 also includes a backing 1359 opposite the actuator 1354. The backing 1359 may support the pump chamber 1356 and prevent, or at least discourage, the pump chamber 1356 from deforming in response to reciprocation of the actuator 1354 (e.g., during an intake or discharge stroke).

Figure 34:
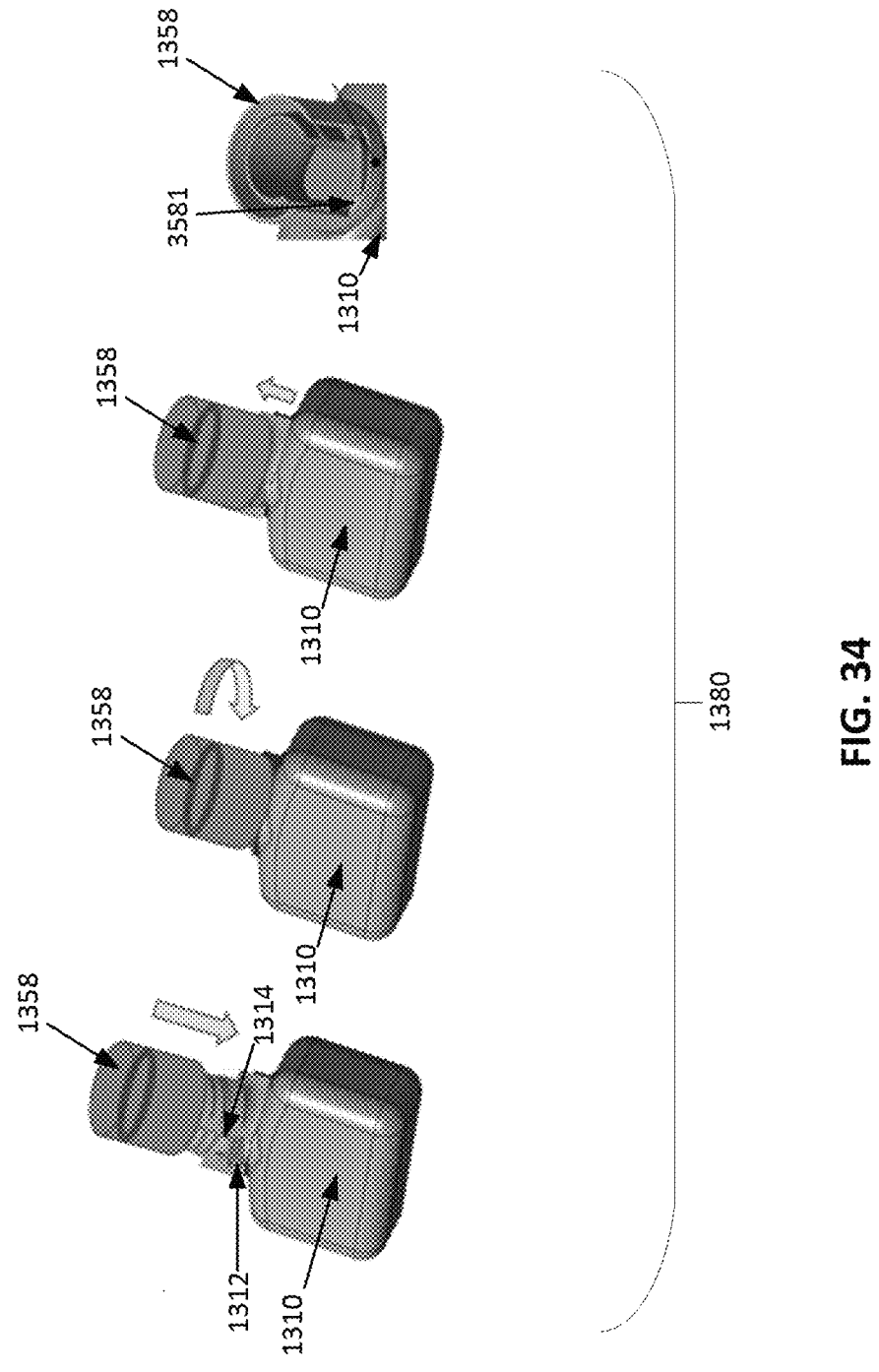
FIG. 34 is a diagram depicting a method of attaching a pump module to a vessel, according to an example embodiment.

Now turning to FIG. 34, a method 1380 of coupling the connection 1358 of a pump module 1350 (or in some embodiments, a nozzle housing) to the vessel 1310 is illustrated. For simplicity, the connection 1358 is illustrated independently of the pump module 1350 in FIG. 14. In the depicted embodiment, the connection 1358 is initially moved longitudinally (e.g., downwards) onto the outlet 1312 of the vessel 1310 through the slot in the slotted thread 1314. Then, the connection 1358 is compressed and twisted to rotate the connection 1358 onto the slotted thread 1314 and, more specifically, to rotate past a lock tab 3581 of the connection 1358 into engagement with a bayonet-style protrusion included on the slotted thread 1314. This locks the connection 1358 into place on the vessel 1310 and prevents the pump module 1350 from being removed from the vessel 1310 without damaging the pump module 1350. In at least some embodiments, an O-ring on the connection 1358 may enable the aforementioned compression while still ensuring the connection 1358 provides a sealed connection between the vessel 1310 and the pump module 1350.

In view of the foregoing, in one embodiment, the connection 1358 and/or method 1380 may discourage a user from disassembling a removable additive assembly 1300. Instead, a user will be encouraged to replace a removable additive assembly 1300 as a single unit. Advantageously, this encourages a user to replace all portions of the additive delivery system 500 that are in direct contact with an additive—the additive assembly 502 or 504—at predetermined intervals. For example, this may encourage a user to replace an entire additive assembly 502 or 504 after the additive assembly 502 or 504 dispenses approximately 30 milliliters (mL) to approximately 41 mL of additive. This may prevent microbial growth, limit contaminant introduction, and otherwise enhance cleanliness of the system which, in turn, may prevent clogging. Moreover, since the additive assemblies 502 and 504 only include limited mechanical pump components (since most of these components are included in the cover body 310), the additive assembly 502 or 504 may provide a sustainable solution that limits waste over the life of the additive assembly.

Figure 35:
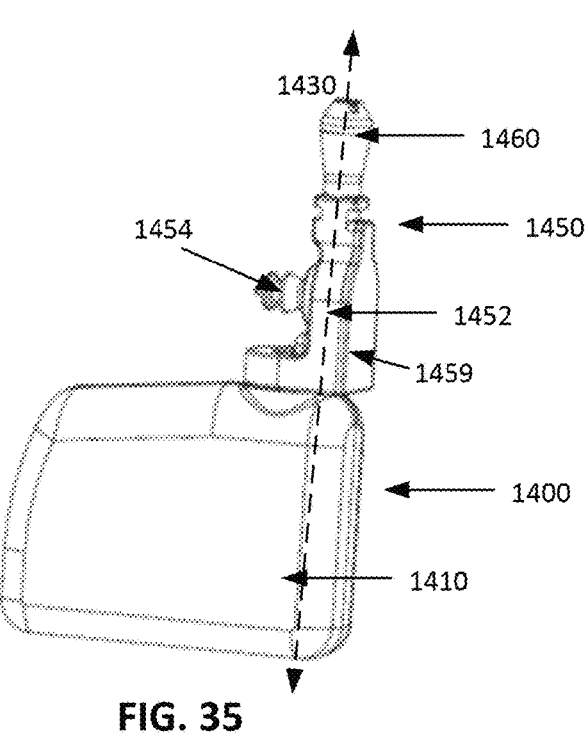
FIG. 35 is a perspective view of another embodiment of a pump module connected to a vessel to form an additive assembly for use with a water dispensing apparatus.
Figure 36:
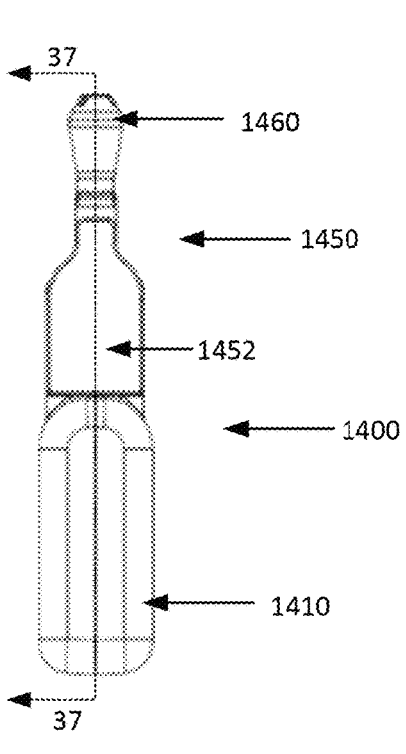
FIG. 36 is a side view of the additive assembly illustrated in FIG. 35.
Figure 36:
Figure 37:
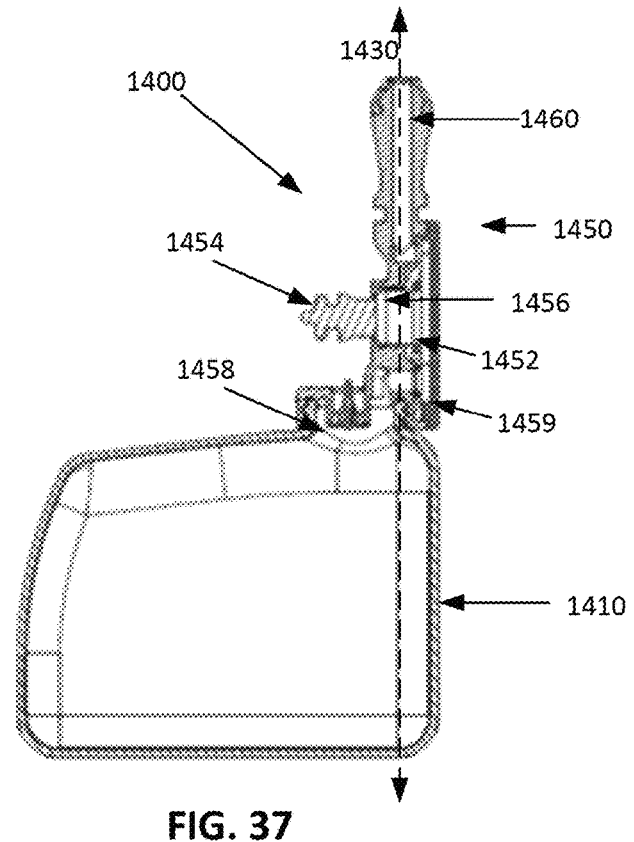
FIG. 37 is a cross-sectional front view of the additive assembly illustrated in FIG. 35 taken along line "37-37" in FIG. 36.

Now turning to FIGS. 35-37, these Figures depict another example embodiment of an additive assembly 1400 that may execute the techniques presented herein. Specifically, FIGS. 35-37 provide a front perspective view, a bottom view, a side view, and a sectional view, respectively, of the additive assembly 1400. The additive assembly 1400 includes a vessel 1410 coupled to a pump module 1450 that includes a pump 1452 and a nozzle 1460. Additionally, the pump 1452 includes an actuator 1454, a pumping chamber 1456, a connector 1458, and a backing 1459. However, now, the vessel 1410 includes an outlet disposed at or adjacent a side of the vessel 1410, along axis 1430, and the pump module 1450 is also substantially aligned along axis 1430. This additive assembly 1400 is merely one example of additive assembly variations that are contemplated by the present application.

Figure 38:
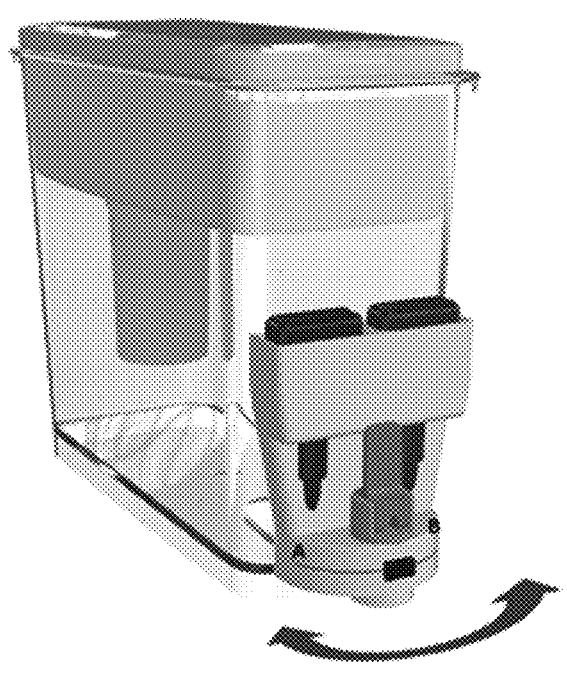
FIG. 38 is a front perspective view of another embodiment of a water dispensing apparatus including an additive assembly.
Figure 39:
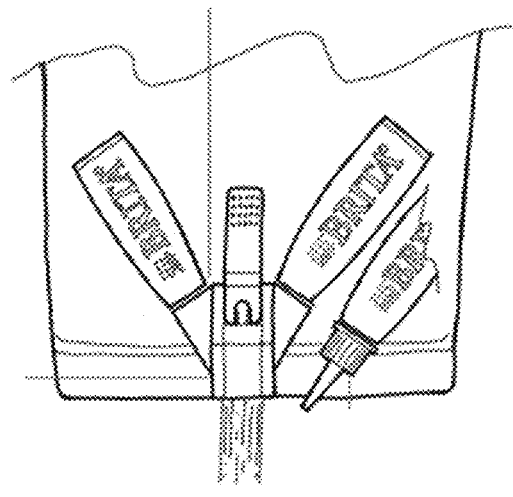
FIG. 39 is a front view of the water dispensing apparatus of FIG. 38 including another embodiment of an additive assembly.

Now turning to FIGS. 38 and 39, as has been mentioned, the water dispensing apparatus 100 and 200 presented herein are just a few examples of a water dispensing apparatus that may implement the techniques presented herein. FIGS. 38 and 39 depict another example water dispensing apparatus, which is generally known as a countertop unit and which dispenses water via a spigot-style spout. In FIG. 38, the countertop unit includes a first embodiment of a countertop-style additive assembly and, in FIG. 39, the countertop unit includes a second embodiment of a countertop-style additive assembly. The first embodiment (FIG. 38) houses/supports removable additive assemblies formed with tank-style vessels. The tank-style vessels are supported in/on a housing disposed on a front of the water dispensing apparatus (adjacent the spigot). By comparison, the second embodiment (FIG. 39) houses/supports removable additive assemblies formed with pouch-style vessels in/on a front of the water dispensing apparatus, adjacent the spigot.

Moreover, each embodiment may include any desirable mechanism to allow a user to select one or both of the removable additive assemblies for dispensing. For example, in the embodiment of FIG. 38, the spigot may be a slider that may slide along the base of the housing towards one vessel or the other to select a vessel for dispensing (e.g., to actuate a mechanical switch while sliding). Then, the vessel is actuated (e.g., pumped) to dispense water with an additive dispensed into the stream of poured water. On the other hand, the embodiment of FIG. 39 may include actuators and/or a switch to select an additive and/or the spigot may be actuated towards a desired additive to dispense an additive.

Regardless of how an additive is selected for dispensing, the dispensing might be mechanically actuated by a spigot pull, which may pour/dispense a predetermined amount of water. This may be possible because the act of pulling the spigot lever can introduce enough energy into the system to dispense an additive without additional power being required. This may be particularly advantageous from a manufacturing (cost and complexity) perspective and for the end user experience (e.g., simple execution with no electronics to maintain). For example, such an execution could eliminate batteries, motors, and electronics, as well as a variety of gears, linkages, and other such parts. Also, a user could achieve variable dosing with multiple spigot pulls and not need to worry about navigating dosage schemes with electronic actuators. That said, in some embodiments, each embodiment could still include actuating components to selectively actuate the vessels supported by the housings (e.g., with such components housed in the vertically extending portion of the housing and/or adjacent the spigot).

Still further, regardless of how additive dispensing is actuated, the pouch could primarily dispense via gravity and, thus, a pouch nozzle could potentially be the dispensing nozzle and could potentially eliminate the need to clean or purge. At the same time, these countertop executions may also realize the contamination advantages described herein since the pouches may dispense additive outside of the container and/or outside of the spout (the spigot).

While this application has described the techniques presented herein in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Finally, for the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

What is claimed is:

1. A water dispensing apparatus, comprising:
a housing defining a first receiving area, a second receiving area, an inlet in fluid communication with the first receiving area, and an outlet in fluid communication with the second receiving area;
a filter in fluid communication with the first receiving area and the second receiving area, water in the first receiving area flows through the filter to the second receiving area; and
an additive delivery system disposable proximate to the housing, the additive delivery system including:
a source of an additive;
a nozzle coupled to the source;
a pump that operates to cause the additive to flow from the source to the nozzle;
a sensor that detects when water is present at the outlet, the sensor causing the pump to operate when water is detected, thereby causing the additive to be added to the water at the outlet;
a controller;
a motor; and
a gear arrangement engaged with the pump, the gear arrangement includes a driver gear that moves the pump, a planetary gear selectively engageable with the driver gear, and a planetary gear carrier to which the planetary gear is mounted,
wherein the controller receives a first signal from the sensor when the sensor detects water, the controller sends a second signal to the motor in response to the first signal, the motor drives the gear arrangement to operate in response to the second signal, and the planetary gear carrier being movable so that the planetary gear moves between a first position in which it is engaged with the driver gear and a second position in which it is spaced apart from the driver gear.

2. The water dispensing apparatus of claim 1, wherein the additive delivery system includes a user selectable portion that contains at least one button, the at least one button being activatable by a user to select the option of the additive delivery system supplying an additive to the water at the outlet.

3. The water dispensing apparatus of claim 2, wherein the at least one button can be pressed by a user multiple times to select a concentration level of the additive to be added.

4. The water dispensing apparatus of claim 1, wherein the gear arrangement is engaged with the pump, and operation of the gear arrangement causes the pump to provide an additive from the source to the nozzle.

5. The water dispensing apparatus of claim 1, wherein the housing includes a third receiving area proximate to the outlet, the nozzle being located in the third receiving area, and the sensor being located in the third receiving area.

6. The water dispensing apparatus of claim 5, wherein the additive delivery system being operable only when the sensor detects the presence of water in the third receiving area and when a user has selected that the additive delivery system is to be operable.

7. The water dispensing apparatus of claim 6, wherein the additive delivery system includes a selector button associated with the source, and a user can actuate the selector button to provide input regarding the source.

8. The water dispensing apparatus of claim 1, further comprising:

a lid removably coupled to the housing, the lid having a body defining a first upper portion and a second upper portion, the first upper portion including a receptacle in which the source may be placed and a first repositionable cover that covers the receptacle, the second upper portion including an opening therethrough and a second repositionable cover that covers the opening, wherein the second repositionable cover can be opened to allow access to the first receiving area, and the first repositionable cover can be opened to allow access to the receptacle for the source.

9. The water dispensing apparatus of claim 8, wherein the lid includes an electronic section located between the first upper portion and the second upper portion, the electronic section including at least one button selectable by a user to indicate that additive from the source is desired.

10. A water dispensing apparatus, comprising:

a housing defining a first internal area, a second internal area, an inlet, and an outlet;

a filter located between and in communication with the first internal area and the second internal area; and a lid removably coupleable to the housing, the lid including a fill opening through which water can pass into the first internal area, the lid also including an additive delivery system coupled thereto, the additive delivery system including:

a vessel containing an additive;

a pump and nozzle assembly coupled to the vessel, the pump and nozzle assembly drawing the additive out of the vessel;

a gear arrangement mounted to the lid, the gear arrangement operably coupleable to and engaged with the pump and nozzle assembly, the gear arrangement includes a driver gear that moves the pump of the pump and nozzle assembly, a planetary gear selectively engageable with the driver gear, and a planetary gear carrier to which the planetary gear is mounted, the planetary gear carrier being movable so that the planetary gear moves between a first position in which it is engaged with the driver gear and a second position in which it is spaced apart from the driver gear; and a sensor that detects the presence of water at the outlet, the sensor causing the pump and nozzle assembly to operate when water is detected, thereby causing the additive to be added to the water at the outlet.

11. The water dispensing apparatus of claim 10, wherein the lid includes a receptacle in which the vessel and the pump and nozzle assembly are located, and the pump and nozzle assembly includes an eccentrically mounted pin that is moved by the gear arrangement.

12. The water dispensing apparatus of claim 10, wherein the additive delivery system includes a button that is activatable by a user to select the additive to be added to the water, and the pump and nozzle assembly operate only after the button has been activated by the user and the sensor detects water.

13. The water dispensing apparatus of claim 10, wherein the housing includes a third receiving area proximate to the outlet, the nozzle of the pump and nozzle assembly being located in the third receiving area, the sensor being located in the third receiving area, the additive delivery system being operable only when the sensor detects the presence of water in the third receiving area and when a user has selected that the additive delivery system is to be operable.

14. The water dispensing apparatus of claim 10, wherein the vessel is a first vessel, the additive is a first additive, the pump and nozzle assembly is a first pump and nozzle assembly, and the additive delivery system further comprises:

a second vessel containing a second additive; and a second pump and nozzle assembly coupled to the second vessel, the second pump and nozzle assembly drawing the second additive out of the second vessel, wherein the gear arrangement is operably coupleable to the second pump and nozzle assembly, and the gear arrangement only allows one of the first pump and nozzle assembly or the second pump and nozzle assembly to operate at once.

15. A water dispensing apparatus, comprising:

a housing defining a first internal area, a second internal area, an inlet, and an outlet;

a filter located between and in communication with the first internal area and the second internal area; and a lid removably coupleable to the housing, the lid including a fill opening through which water can pass into the first internal area, the lid also including an additive delivery system coupled thereto, the additive delivery system including:

a first vessel containing a first additive;

a first pump and nozzle assembly coupled to the first vessel, the first pump and nozzle assembly drawing the first additive out of the first vessel;

a second vessel containing a second additive;

a second pump and nozzle assembly coupled to the second vessel, the second pump and nozzle assembly drawing the second additive out of the second vessel;

a gear arrangement mounted to the lid, the gear arrangement operably coupleable to the first pump and nozzle assembly and to the second pump and nozzle assembly, the gear arrangement only allows one of the first pump and nozzle assembly or the second pump and nozzle assembly to operate at once; and a sensor that detects the presence of water at the outlet, the sensor causing one of the first pump and nozzle assembly or the second pump and nozzle assembly to operate when water is detected, thereby causing one of the first additive or the second additive to be added to the water at the outlet.

16. The water dispensing apparatus of claim 15, wherein the lid includes a receptacle in which the first vessel and the first pump and nozzle assembly are located, and the first pump and nozzle assembly includes an eccentrically mounted pin that is moved by the gear arrangement.

17. The water dispensing apparatus of claim 15, wherein the additive delivery system includes a button that is activatable by a user to select an additive to be added to the water, and either the first pump and nozzle assembly or the second pump and nozzle assembly operates only after the button has been activated by the user and the sensor detects water.

18. The water dispensing apparatus of claim 15, wherein the housing includes a third receiving area proximate to the outlet, the nozzle of the first pump and nozzle assembly being located in the third receiving area, the sensor being located in the third receiving area, the additive delivery system being operable only when the sensor detects the presence of water in the third receiving area and when a user has selected that the additive delivery system is to be operable.

\* \* \* \* \*